United States Patent
Kazlauskas et al.

(10) Patent No.: US 8,512,450 B2
(45) Date of Patent: Aug. 20, 2013

(54) ENGINE AIR PARTICLE SEPARATOR

(75) Inventors: Michael Kazlauskas, Watertown, CT (US); Jon C Peters, Oxford, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 246 days.

(21) Appl. No.: 13/142,615

(22) PCT Filed: Dec. 30, 2008

(86) PCT No.: PCT/US2008/088510
§ 371 (c)(1),
(2), (4) Date: Jun. 29, 2011

(87) PCT Pub. No.: WO2010/077241
PCT Pub. Date: Jul. 8, 2010

(65) Prior Publication Data
US 2011/0265650 A1 Nov. 3, 2011

(51) Int. Cl.
*B01D 45/12* (2006.01)
(52) U.S. Cl.
USPC .......... 95/269; 95/270; 55/306; 55/307; 55/385.1; 55/385.3; 55/447; 244/53 B
(58) Field of Classification Search
USPC ... 55/306, 307, 385.1, 385.3, 447; 244/53 B; 95/269, 270
See application file for complete search history.

(56) References Cited

U.S. PATENT DOCUMENTS

| | | | |
|---|---|---|---|
| 2,983,267 A * | 5/1961 | Percival | 123/559.1 |
| 3,978,656 A | 9/1976 | Murphy | |
| 3,993,463 A | 11/1976 | Barr | |
| 4,002,024 A | 1/1977 | Nye et al. | |
| 4,004,760 A | 1/1977 | Ando et al. | |
| 4,250,703 A | 2/1981 | Norris et al. | |
| 4,309,147 A | 1/1982 | Koster et al. | |
| 4,397,431 A | 8/1983 | Ben-Porat | |
| 4,531,694 A | 7/1985 | Soloy | |
| 4,617,028 A | 10/1986 | Ray et al. | |
| 4,783,026 A | 11/1988 | Rumford et al. | |
| 4,795,561 A | 1/1989 | Aslin | |
| 4,852,343 A | 8/1989 | Norris et al. | |
| 4,860,534 A | 8/1989 | Easley et al. | |
| 4,864,819 A | 9/1989 | Steyer | |
| 5,039,317 A | 8/1991 | Thompson et al. | |

(Continued)

FOREIGN PATENT DOCUMENTS

| | | |
|---|---|---|
| JP | 2008075648 | 4/2008 |
| WO | 2006113388 | 10/2006 |

OTHER PUBLICATIONS

International Search Report and Written Opinion, mailed Feb. 23, 2010.

*Primary Examiner* — Jason M Greene
*Assistant Examiner* — Dung H Bui
(74) *Attorney, Agent, or Firm* — Carlson, Gaskey & Olds, P.C.

(57) ABSTRACT

A filtration system for a gas turbine engine includes an inlet main body which defines an inner inlet fairing section and a bellmouth inlet faring section transverse thereto. An Engine Air Particle Separator (EAPS) is mounted adjacent to the inlet main body to define a plenum therein. A particulate laden airflow is filtered by the Engine Air Particle Separator (EAPS) to produce a substantially filtered airflow. The substantially filtered airflow is communicated into the plenum, through the bellmouth inlet faring section and into a gas turbine engine.

20 Claims, 24 Drawing Sheets

(56) References Cited

U.S. PATENT DOCUMENTS

| | | |
|---|---|---|
| 5,042,603 A | 8/1991 | Olson |
| 5,139,545 A | 8/1992 | Mann |
| 5,201,801 A | 4/1993 | Smith, Jr. |
| 5,222,693 A | 6/1993 | Slutzkin et al. |
| 5,377,934 A | 1/1995 | Hill |
| 5,662,292 A | 9/1997 | Greene et al. |
| 5,697,394 A | 12/1997 | Smith et al. |
| 5,722,229 A | 3/1998 | Provost |
| 5,746,789 A | 5/1998 | Wright et al. |
| 5,791,594 A | 8/1998 | Hill |
| 6,001,057 A | 12/1999 | Bongiovanni et al. |
| 6,595,742 B2 | 7/2003 | Scimone |
| 6,702,873 B2 | 3/2004 | Hartman |
| 6,746,207 B1 | 6/2004 | Mundt et al. |
| 6,817,572 B2 | 11/2004 | Negulescu et al. |
| 6,872,232 B1 | 3/2005 | Pavlatos |
| 6,974,105 B2 | 12/2005 | Pham |
| 7,160,345 B2 | 1/2007 | Pavlatos |
| 7,296,395 B1 | 11/2007 | Hartman et al. |
| 2005/0229558 A1 | 10/2005 | Stelzer et al. |

* cited by examiner

ENGINE AIR PARTICLE SEPARATOR

STATEMENT REGARDING FEDERALLY SPONSORED RESEARCH OR DEVELOPMENT

This invention was made with Government support under N00019-06-C-0081 awarded by The United States Navy. The Government has certain rights in this invention.

BACKGROUND

The present application relates to a filtration system, and more particularly to a filtration system to filter air inducted into a gas turbine engine for a rotary-wing aircraft.

Filtration systems for gas turbine engines may include Engine Air Particle Separator (EAPS). These systems are configured to be mounted ahead of the engine inlet ducts and are typically mounted as an add-on kit. The attachment of the add-on filtration system with an existing inlet may introduce issues such as reduced inlet performance since the airframe mounted inlet is typically designed to operate optimally without the filtration system installed.

The EAPS is configured to discharge particulates overboard and direct cleaned air into the gas turbine engine inlet. After passing through the EAPS, the airflow travels along a relatively long S-shaped inlet such that the air is relatively quickly accelerated into the gas turbine inlet. Although effective at particulate separation, the cleaned airflow is communicated through the EAPS and inlet at a relatively high velocity and along a serpentine path. The relatively high airflow velocity may produce inlet performance sensitivity in which relatively small changes to the airflow within the EAPS or inlet may in some instances result in a relatively large inlet pressure loss.

SUMMARY

A filtration system for a gas turbine engine according to an exemplary aspect of the present invention includes: an inlet main body comprising an inner inlet fairing section and a bellmouth inlet faring section transverse thereto, the inner inlet fairing section defines a shaft projection portion directed along an axis to extend toward an inner perimeter of the bellmouth inlet faring section; and an Engine Air Particle Separator (EAPS) adjacent the inlet main body to define a plenum therein.

A method of particle separation for a gas turbine engine according to an exemplary aspect of the present invention includes: communicating a particulate laden airflow into an Engine Air Particle Separator (EAPS) mounted to an inlet main body to produce a substantially filtered airflow, the substantially filtered airflow communicated into a plenum defined by the Engine Air Particle Separator (EAPS) to flow through a bellmouth inlet faring section defined by the inlet main body.

BRIEF DESCRIPTION OF THE DRAWINGS

The various features and advantages of this invention will become apparent to those skilled in the art from the following detailed description of the disclosed non-limiting embodiment. The drawings that accompany the detailed description can be briefly described as follows.

DETAILED DESCRIPTION OF THE EXEMPLARY EMBODIMENTS

Figure 1A:
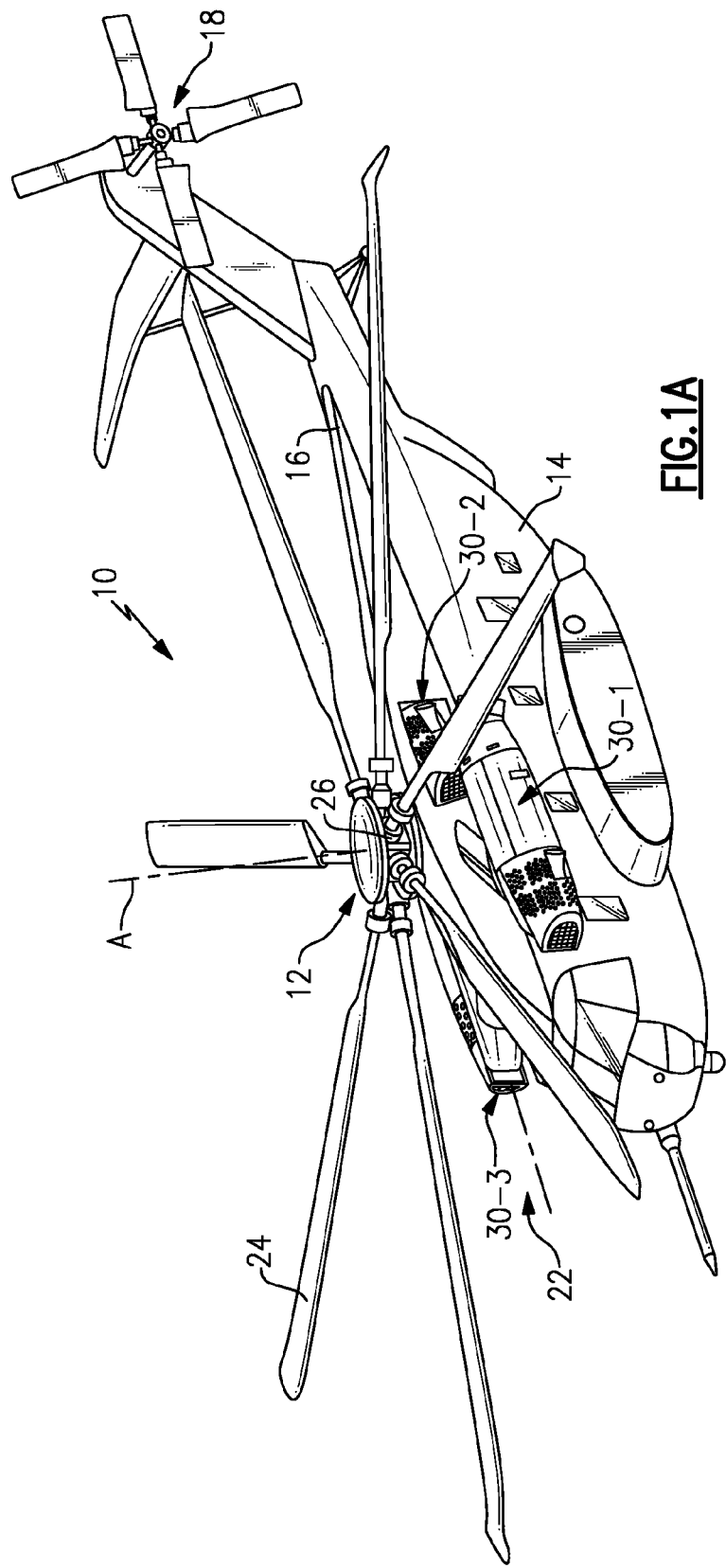
FIG. 1A is a general perspective view of an exemplarily rotary-wing aircraft for use with one non-limiting embodiment of the present invention.

FIG. 1A schematically illustrates a rotary-wing aircraft 10 with a main rotor system 12. The aircraft 10 includes an airframe 14 having an extending tail 16 which mounts an anti-torque system 18. The main rotor system 12 is driven about an axis of rotation A through a MGB 20 (FIG. 1B) by a multi-engine powerplant system 22—here three engine packages ENG1, ENG2, ENG3. The multi-engine powerplant system 22 is integrated with the MGB 20 to drive the main rotor system 12 and the anti-torque system 18. The main rotor system 12 includes a multiple of rotor blades 24 mounted to a rotor hub 26.

Although a particular helicopter configuration is illustrated and described in the disclosed embodiment, other configurations and/or machines, such as high speed compound rotary-wing aircraft with supplemental translational thrust systems, dual contra-rotating, coaxial rotor system aircraft, turboprops, tilt-rotors and tilt-wing aircraft, will also benefit from the present invention. Furthermore, one skilled in the art will appreciate that other vehicles and aircraft which have front output shaft engines will be able to use this concept in order to reduce pressure losses and improve system performance.

Figure 1B:
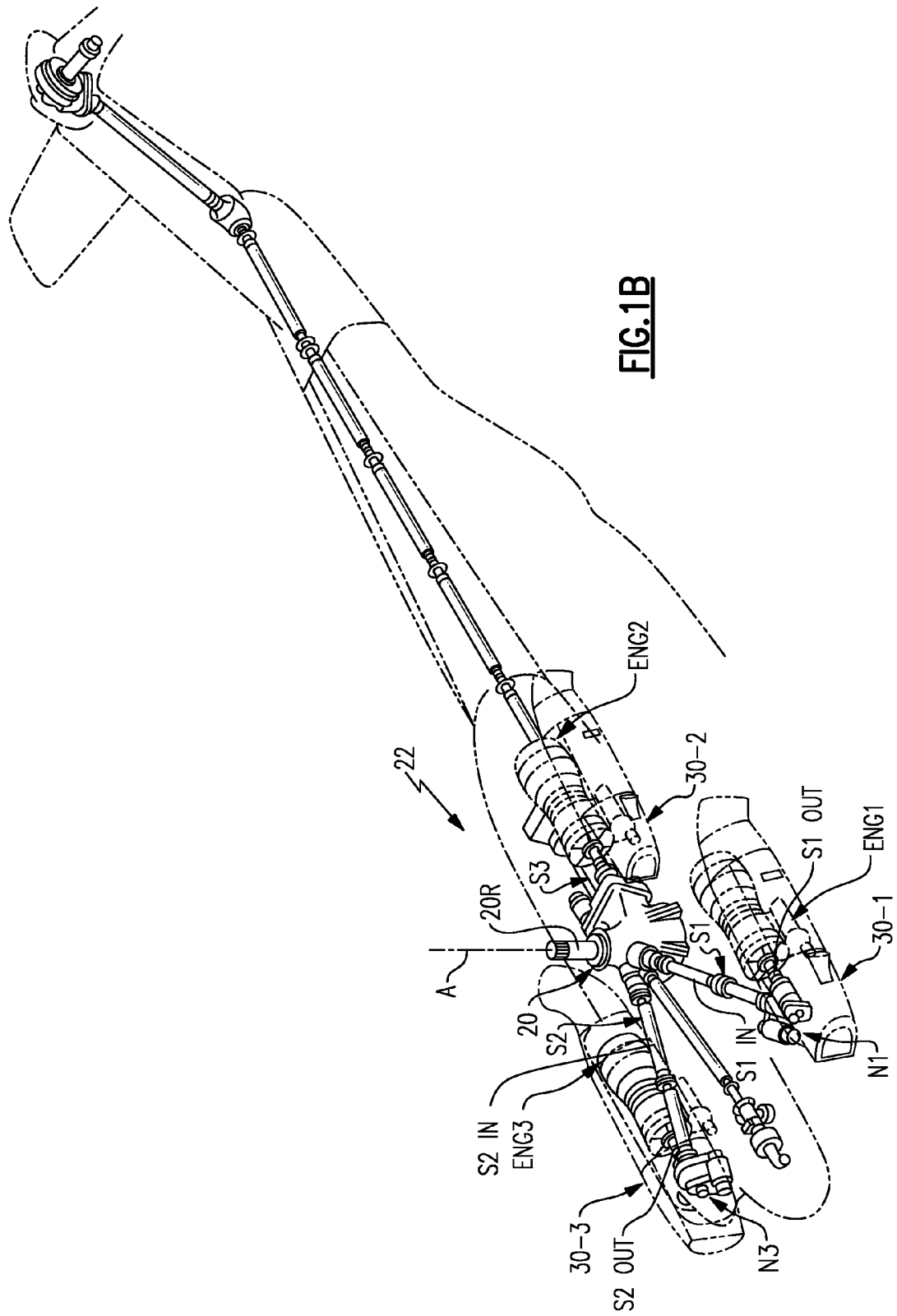
FIG. 1B is a partial phantom view of the exemplarily rotary-wing aircraft powerplant system.

Referring to FIG. 1B, engine packages ENG1, ENG2, ENG3 of the multi-engine powerplant system 22 drive the MGB 20 through a respective shaft arrangement S1, S2, S3. The shaft arrangements S1, S3 typically include a nose gearbox N1, N3 which connect an engine output shaft system $s1_{out}$, $s2_{out}$ with a respective input shaft system $s1_{in}$, s2in into the MGB 20.

Figure 1C:
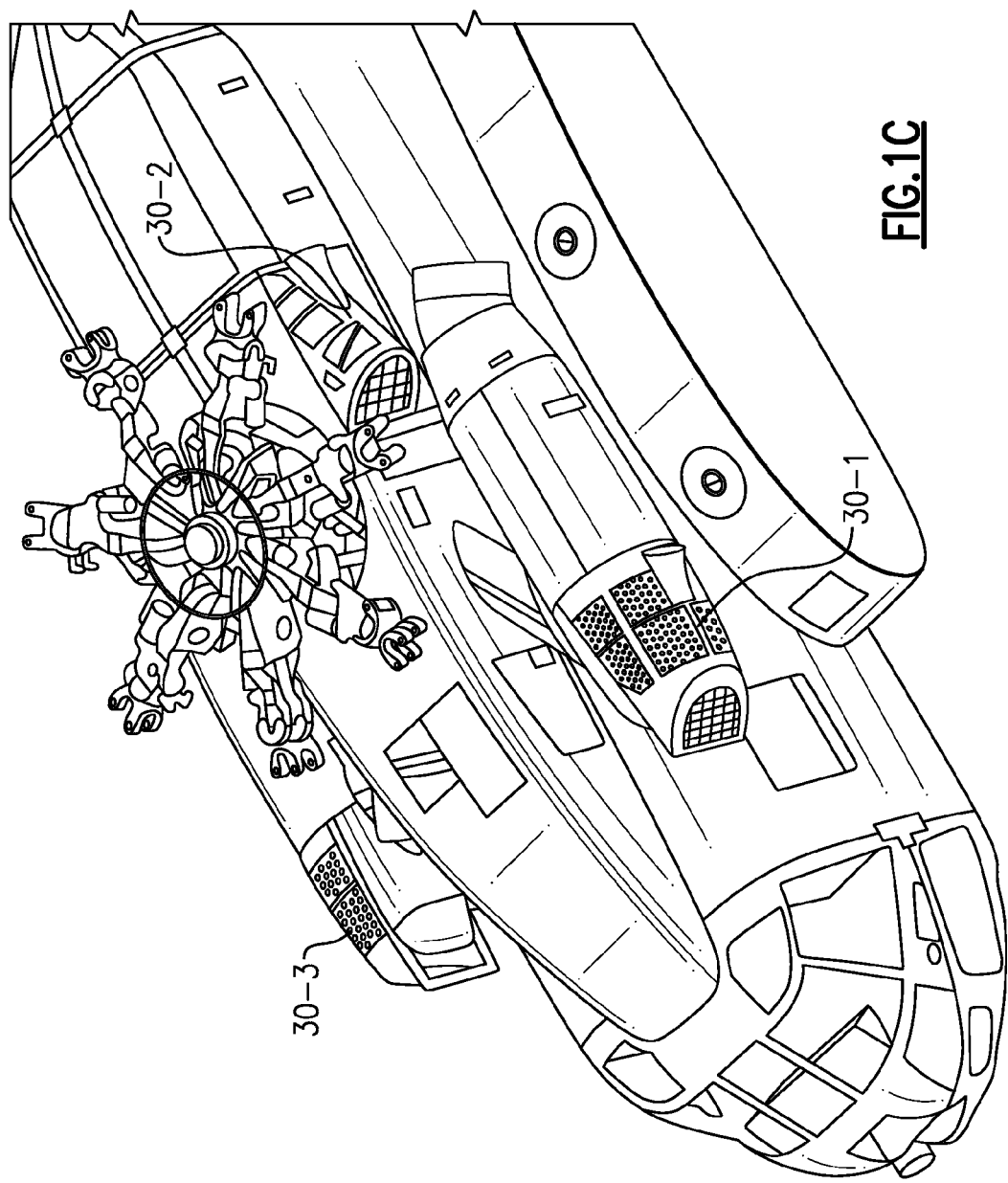
FIG. 1C is a perspective view of the exemplarily rotary-wing aircraft illustrating a filtration system for each engine package in the powerplant system.
Figure 2A:
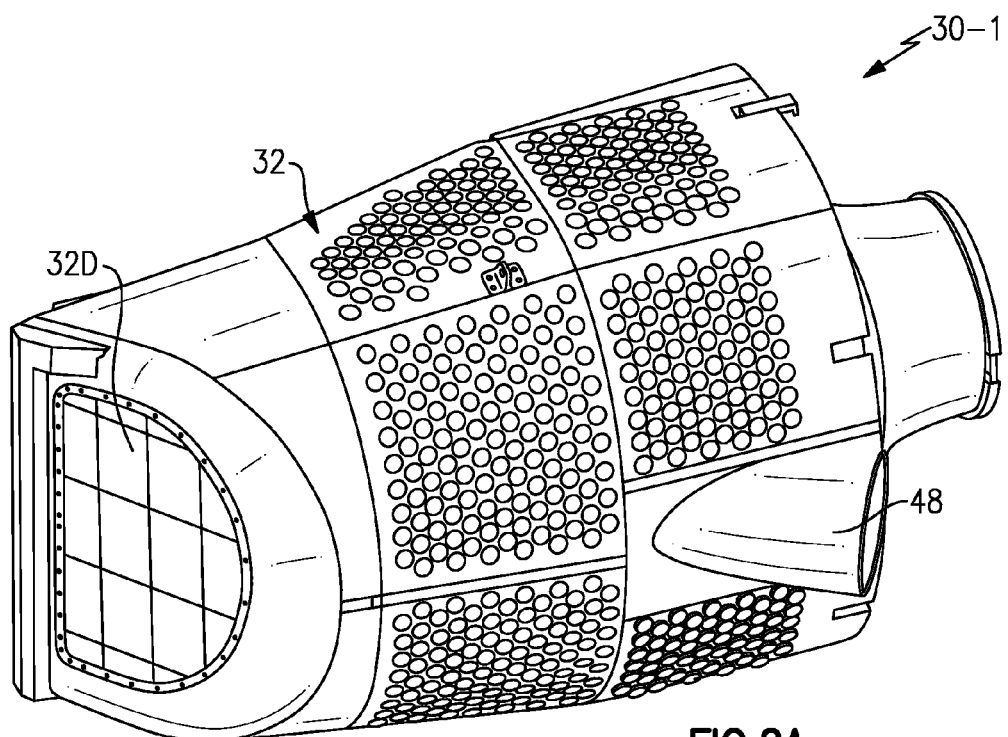
FIG. 2A is a front perspective view of a filtration system for one engine package in the powerplant system.
Figure 2B:
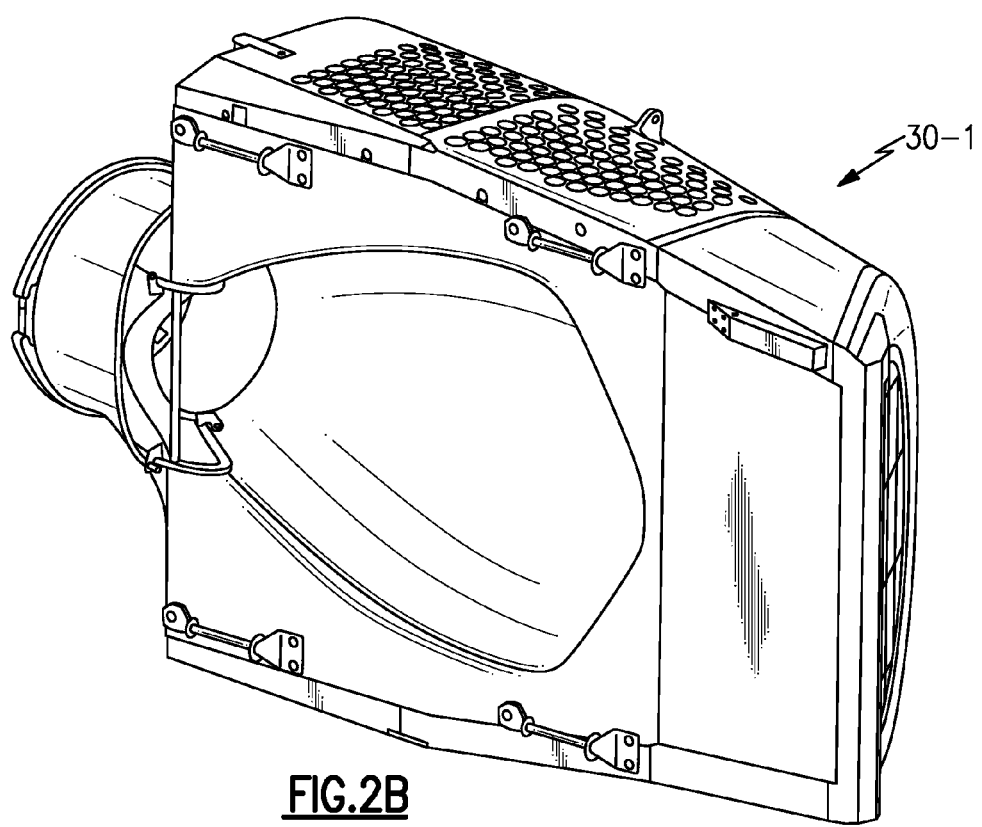
FIG. 2B is a back perspective view of the filtration system of FIG. 2A.
Figure 2C:
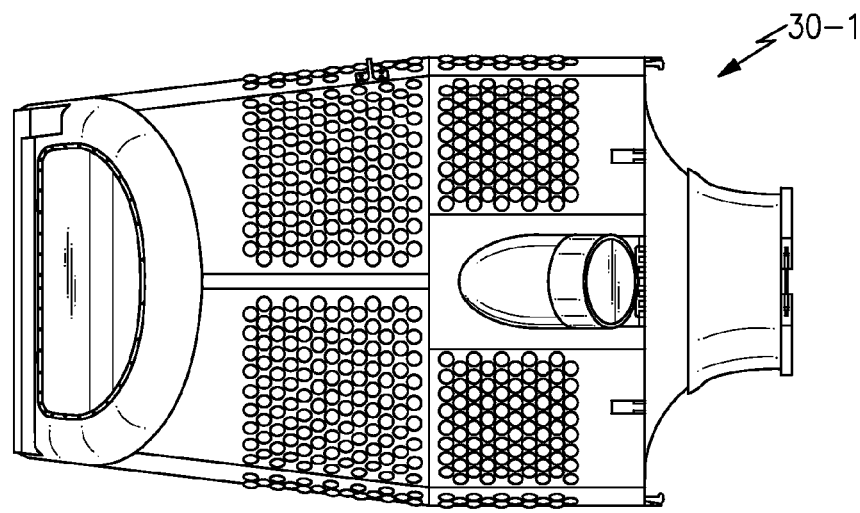
FIG. 2C is a side view of the filtration system of FIG. 2A.
Figure 2D:
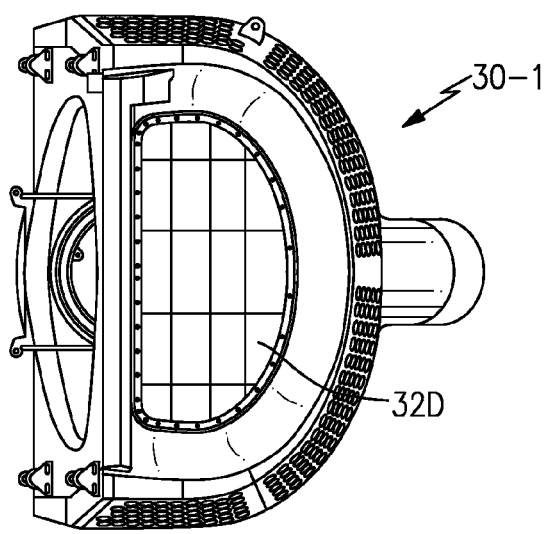
FIG. 2D is a front view of the filtration system of FIG. 2A with an EAPS door in a closed position.
Figure 2E:
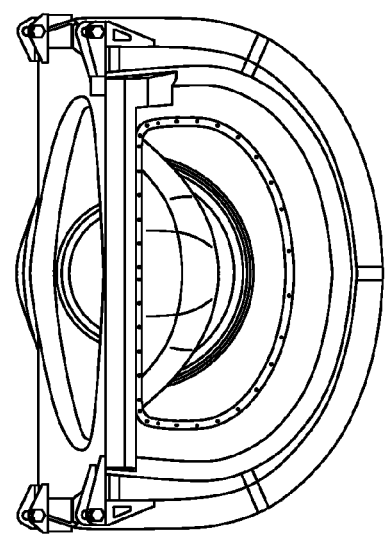
FIG. 2E is a front view of the filtration system of FIG. 2A with the EAPS door in an open position.
Figure 2F:
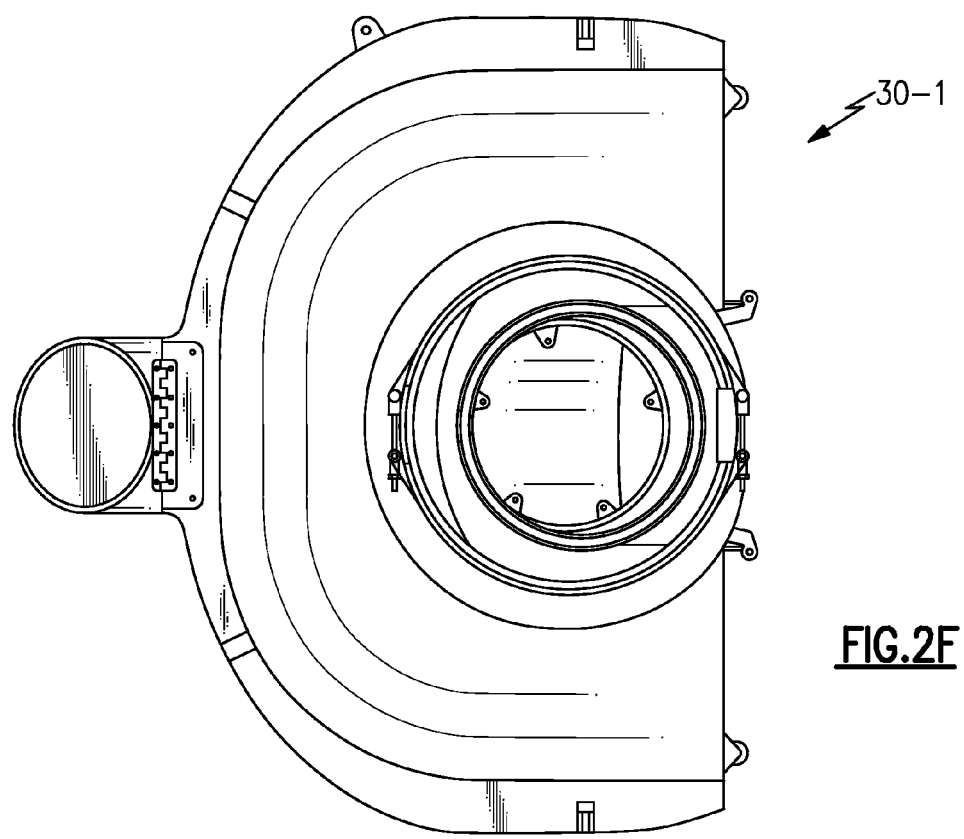
FIG. 2F is a rear view of the filtration system of FIG. 2A.
Figure 2G:
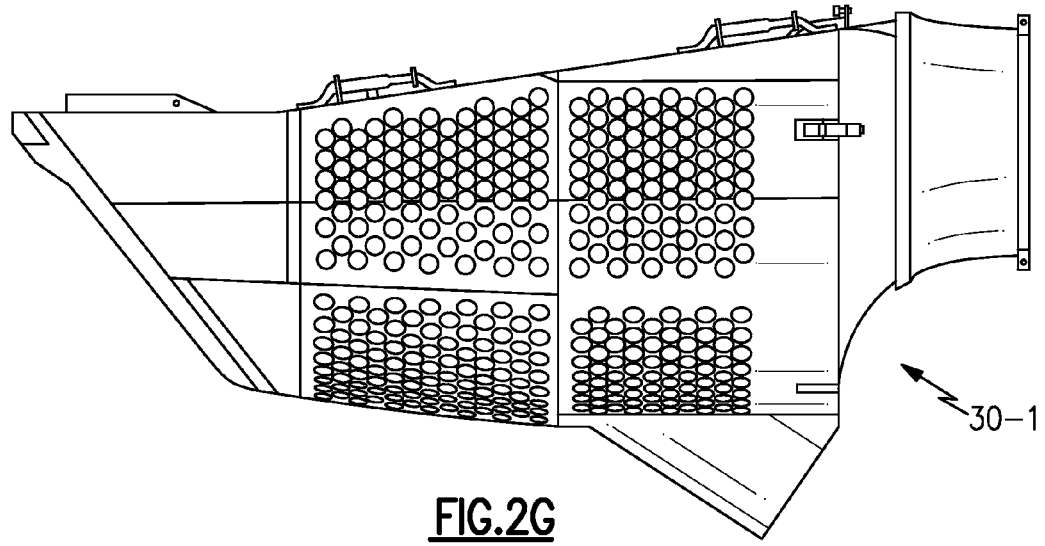
FIG. 2G is a top view of the filtration system of FIG. 2A.
Figure 3A:
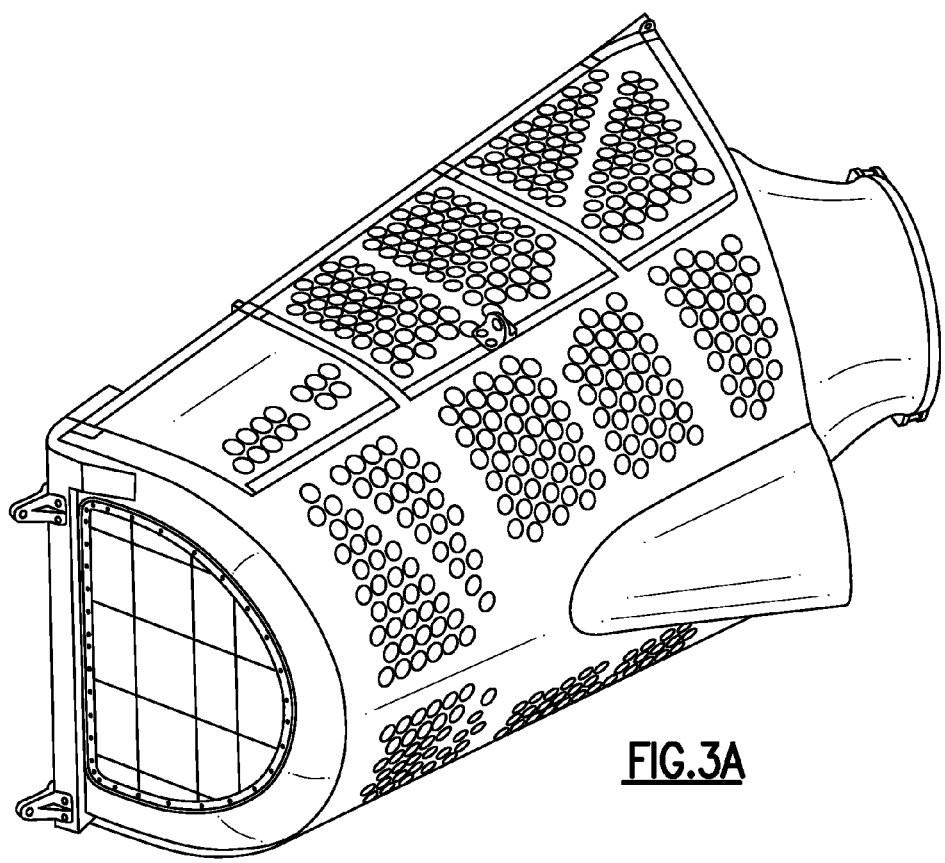
FIG. 3A is a front perspective view of a filtration system for another engine package in the powerplant system.
Figure 3B:
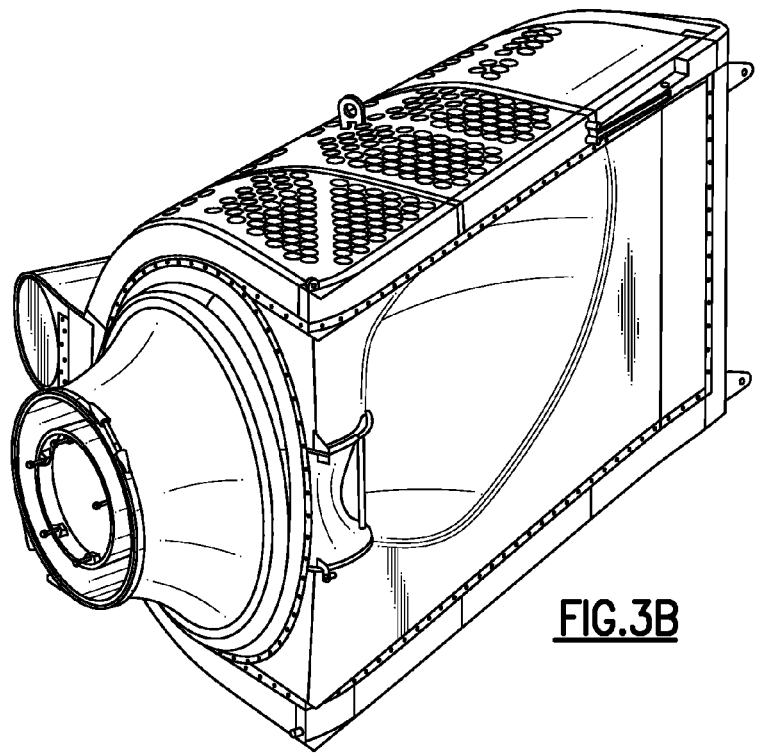
FIG. 3B is a back perspective view of the filtration system of FIG. 31.
Figure 3C:
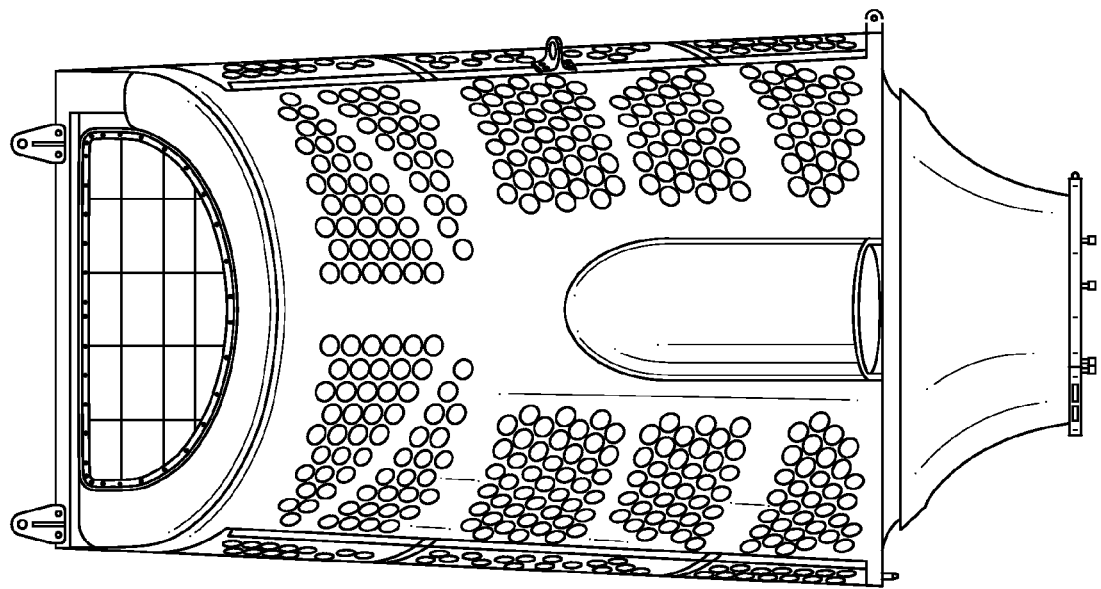
FIG. 3C is a side view of the filtration system of FIG. 3A.
Figure 3D:
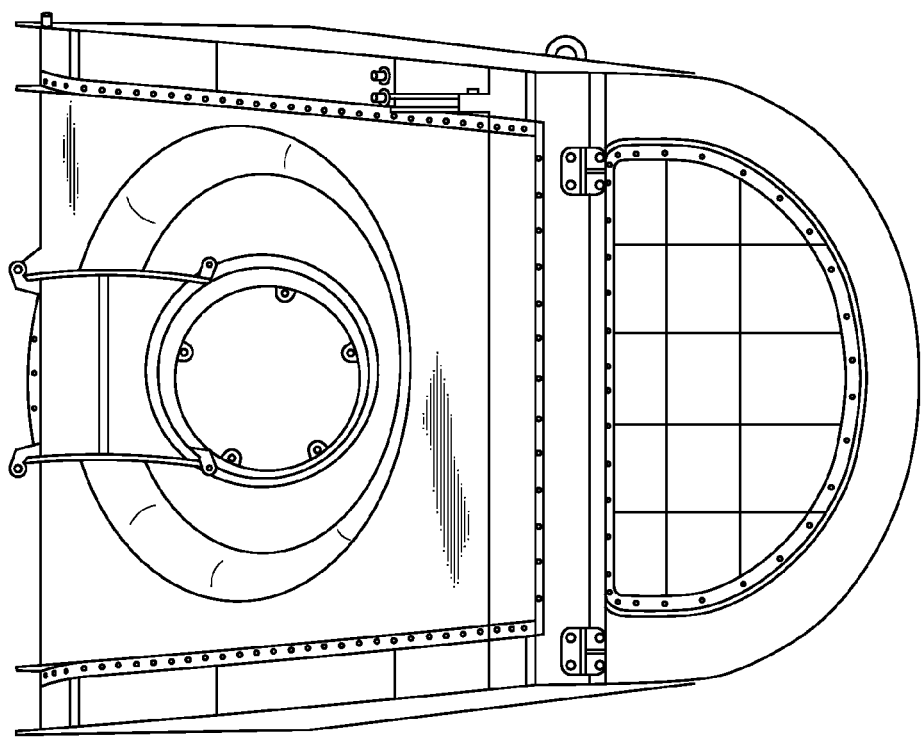
FIG. 3D is a front view of the filtration system of FIG. 3A.
Figure 3E:
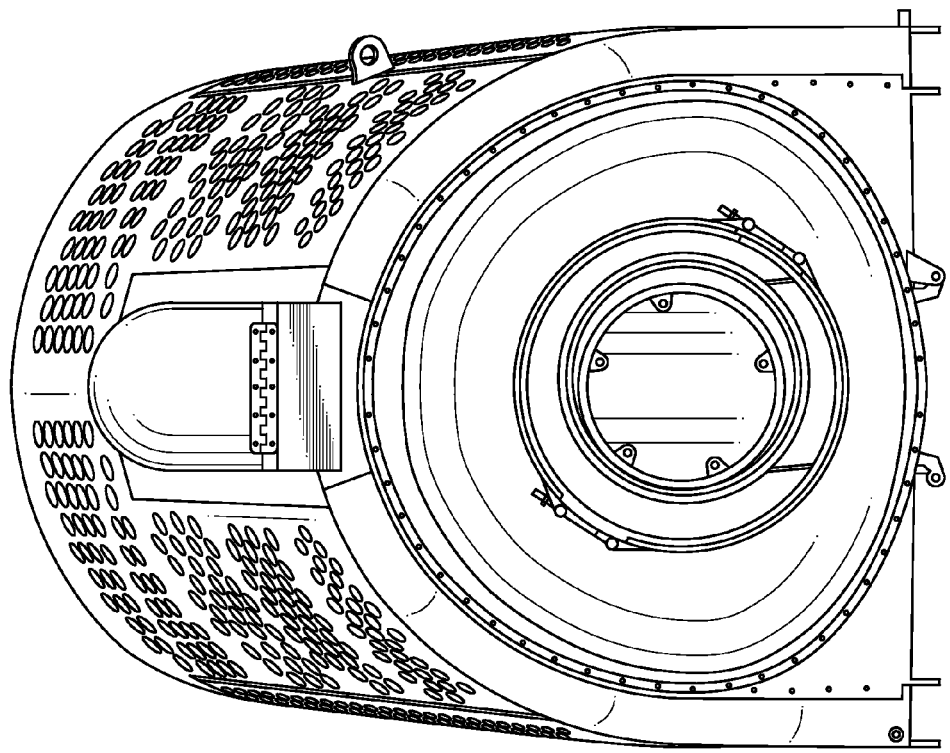
FIG. 3E is a rear view of the filtration system of FIG. 3A.
Figure 3F:
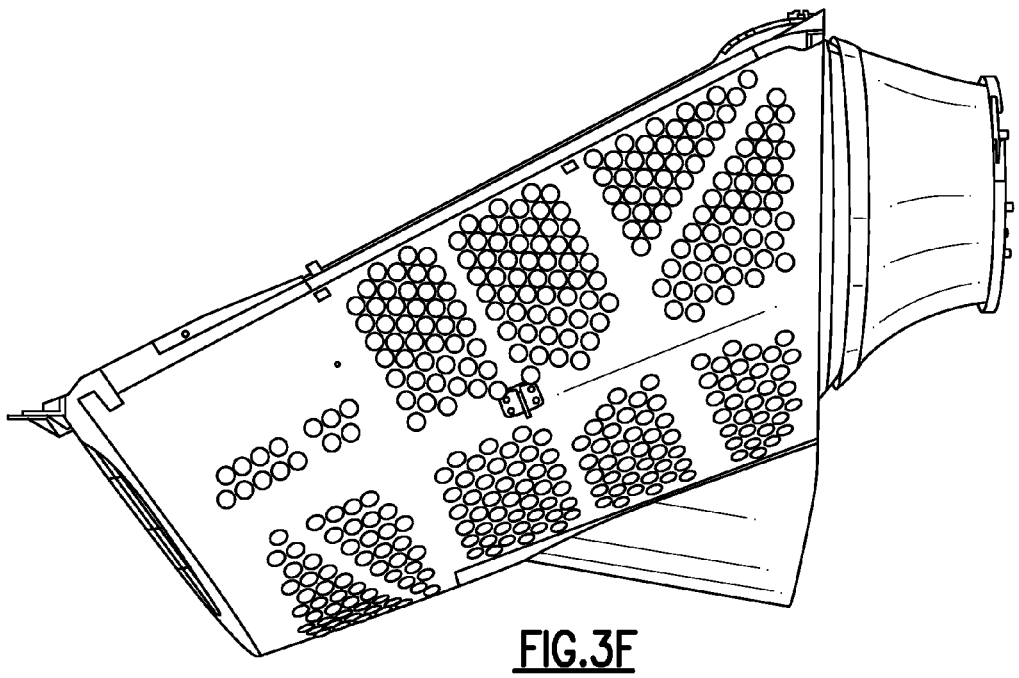
FIG. 3F is a top view of the filtration system of FIG. 3A.

Each of the engine packages ENG1, ENG2, ENG3 includes a respective filtration system 30-1, 30-2, 30-3 (FIG. 1C). The filtration systems 30-1, 30-3 are located generally outboard of and at least partially surround the respective nose gearbox N1, N3.

It should be understood that although the filtration system 30-1 (FIGS. 2A-2G) for engine package ENG1, will be described in detail in the disclosed non-limiting embodiment, the filtration systems 30-2, 30-3 are generally alike in configuration and operational concept. Furthermore, whereas engine package ENG2 is mounted in a different location, filtration system 30-2 (FIGS. 3A-3F) is of a slightly different configuration than filtration systems 30-1, 30-3 but also still includes the operational concepts described in detail herein.

Figure 4:
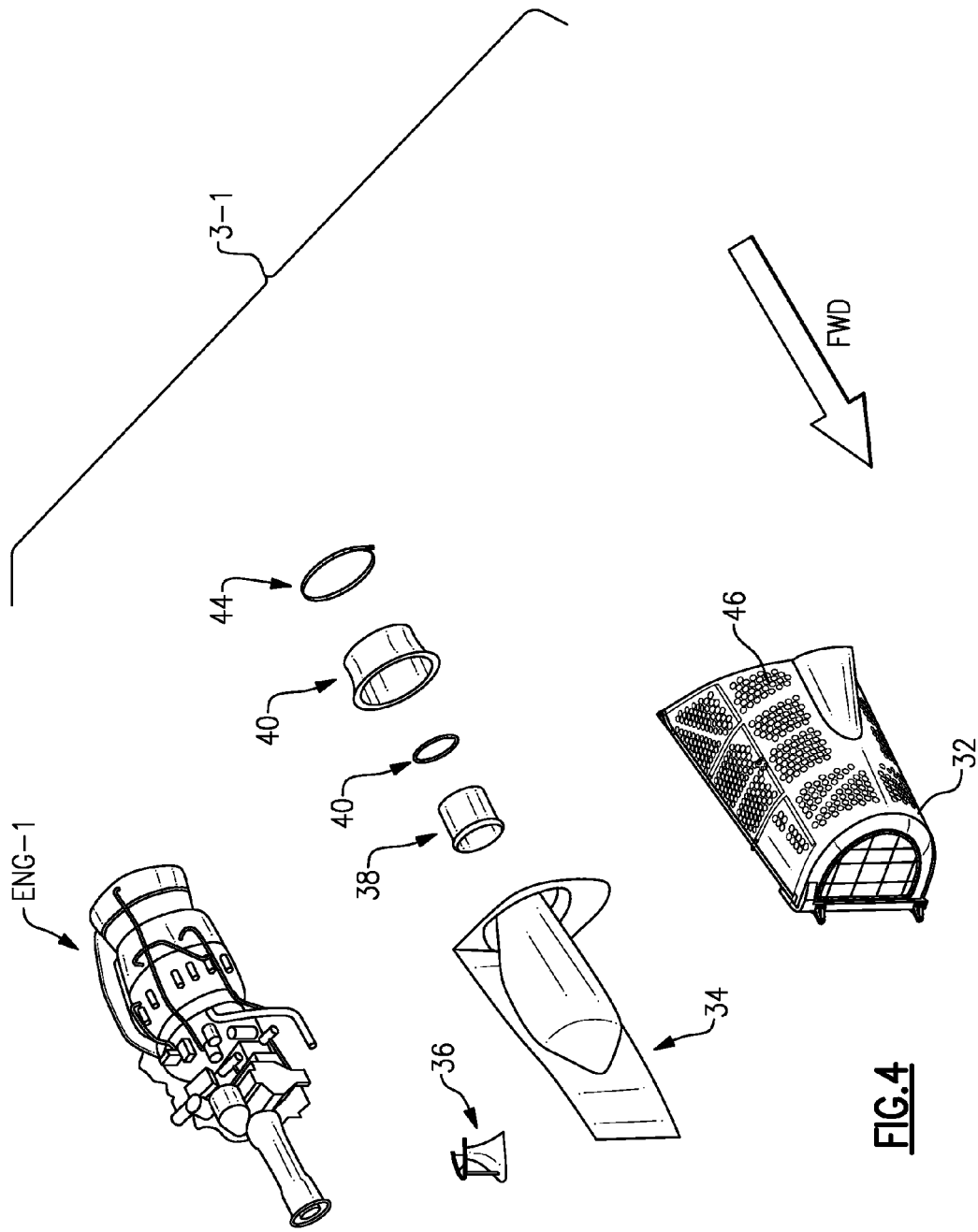
FIG. 4 is an exploded view of one non-limiting embodiment of the filtration system.

Referring to FIG. 4, the filtration system 30-1 for engine package ENG1 generally includes an Engine Air Particle Separator (EAPS) 32, an inlet main body 34, a closeout 36, an inner duct 38, an inner duct seal 40, an outer duct 42, and a clamp 44. It should be understood that although a particular component arrangement is disclosed in the illustrated embodiment, other arrangements which may or may not include barrier filters, inertial separator tubes and combinations thereof will benefit from the disclosure herein.

Figure 5A:
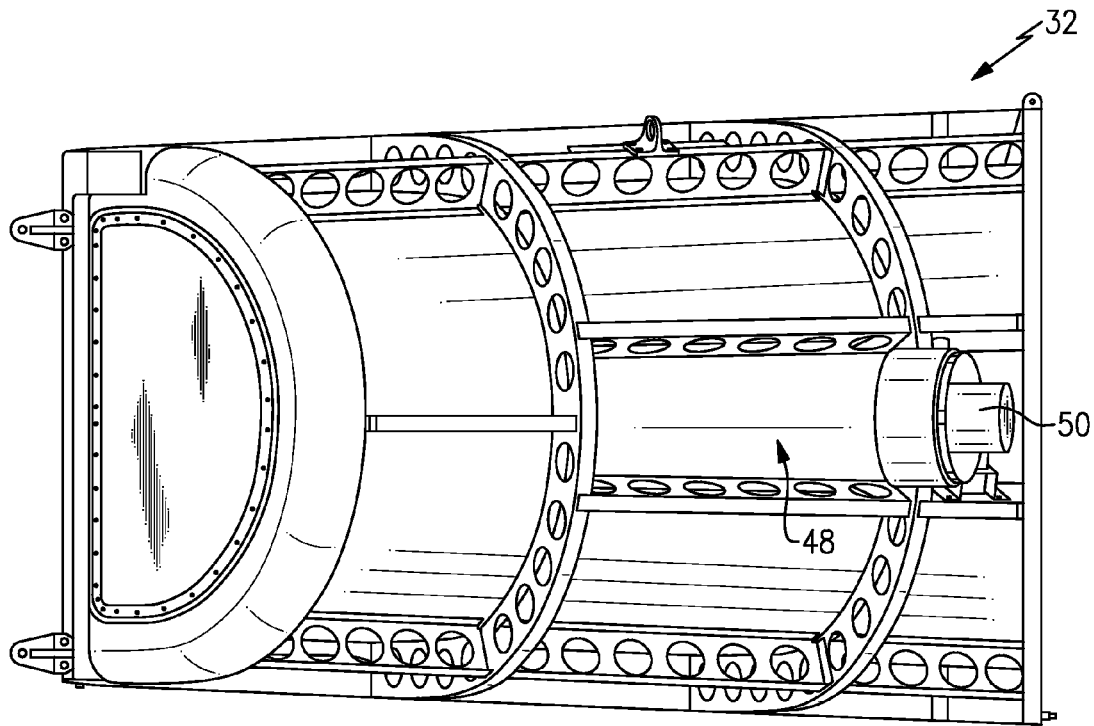
FIG. 5A is an internal frame view of one non-limiting embodiment of the filtration system with the outer skin removed to illustrate the scavenge plenum.
Figure 5B:
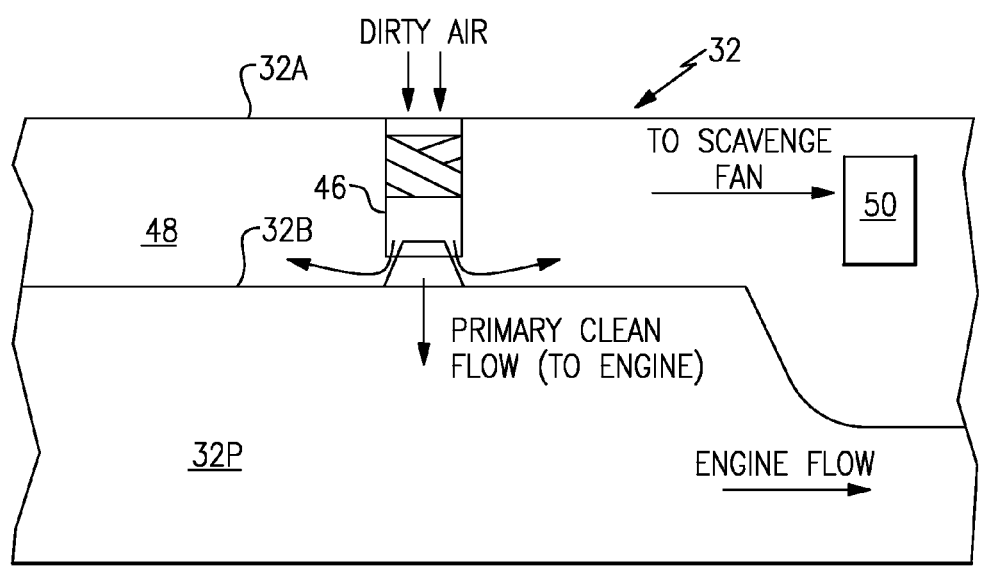
FIG. 5B is a sectional view of the of the filtration system to illustrate the scavenge system.

The EAPS 32 supports a plurality of individual centrifugal separator inertial separator swirl tubes 46. The EAPS 32 is sized and configured to be mounted ahead of the engine to reduce the erosion of the engine from particulate ingestion. The EAPS 32 is configured to discharge dirty particulate laden air overboard through a scavenge system 48 powered by an electric blower 50 (FIG. 5A) and communicate cleaned air to enter the engine ENG1. The inertial separator swirl tubes 46 communicate cleaned air into a plenum 32P defined by the EAPS 32, while the particulate is separated into the scavenge system 48. The scavenge system 48 is generally located between an outer skin 32A of the EAPS 32 and an inner skin 32B of the EAPS 32 which define the plenum 32P (FIG. 5B). The inertial separator swirl tubes 46 extend between the outer skin 32A and the inner skin 32B.

An EAPS bypass door 32D in the front of the EAPS 32 (FIGS. 2D and 2E) may also be operated between a closed position (FIG. 2D) and an open position (FIG. 2E) to facilitate the efficient capture of ram air. The EAPS bypass door 32D is typically closed below a predetermined airspeed and open above the predefined airspeed. It should be understood that although a single sloped EAPS bypass door 32D is disclosed in this non-limiting embodiment, other EAPS bypass door arrangements such as a clamshell door or a multi-door structure may alternatively or additionally be utilized.

Figure 6A:
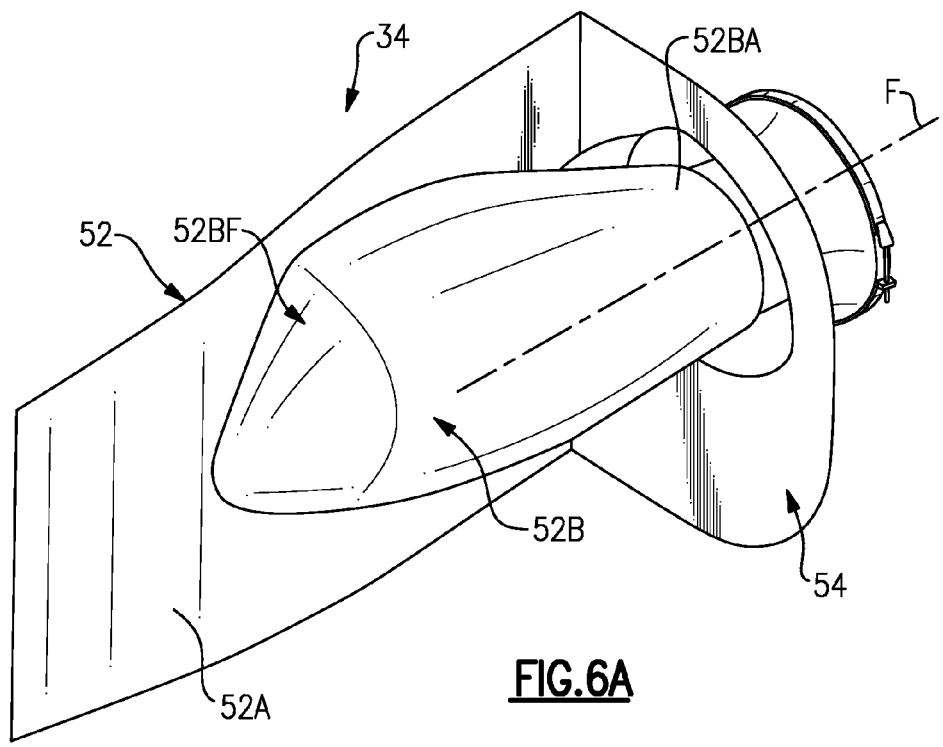
FIG. 6A is a front perspective view of an inlet main body of the filtration system.
Figure 6B:
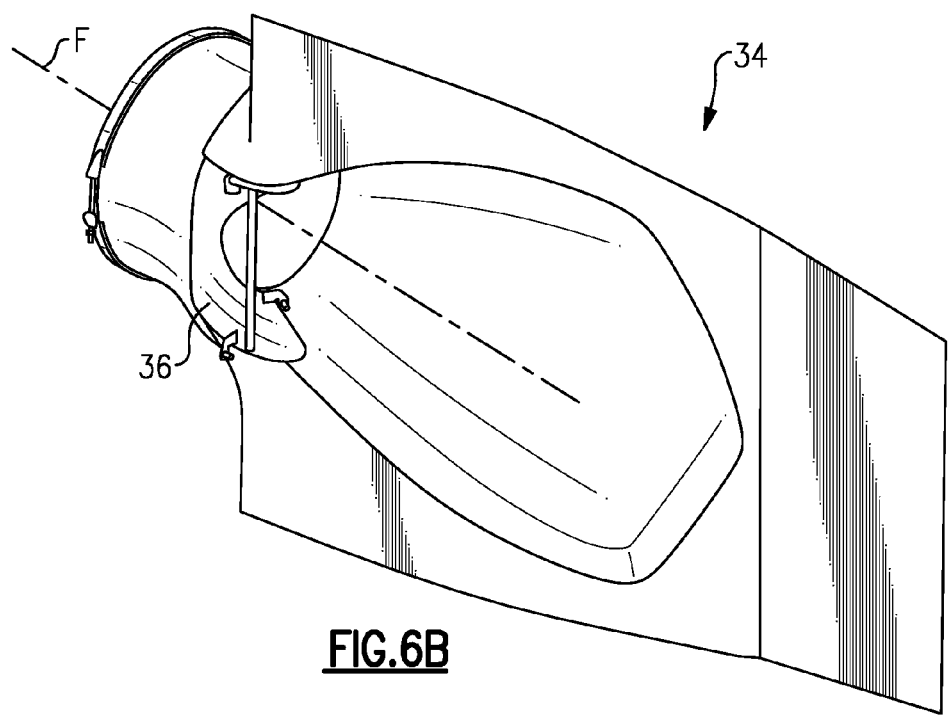
FIG. 6B is a back perspective view of the inlet main body of FIG. 6A.
Figure 6C:
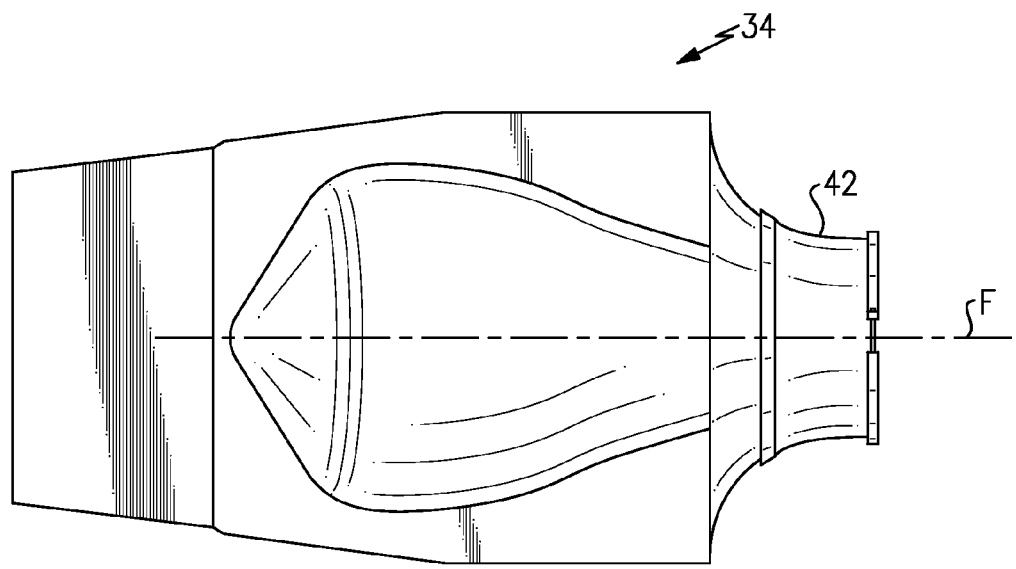
FIG. 6C is a side view of the inlet main body of FIG. 6A.
Figure 6D:
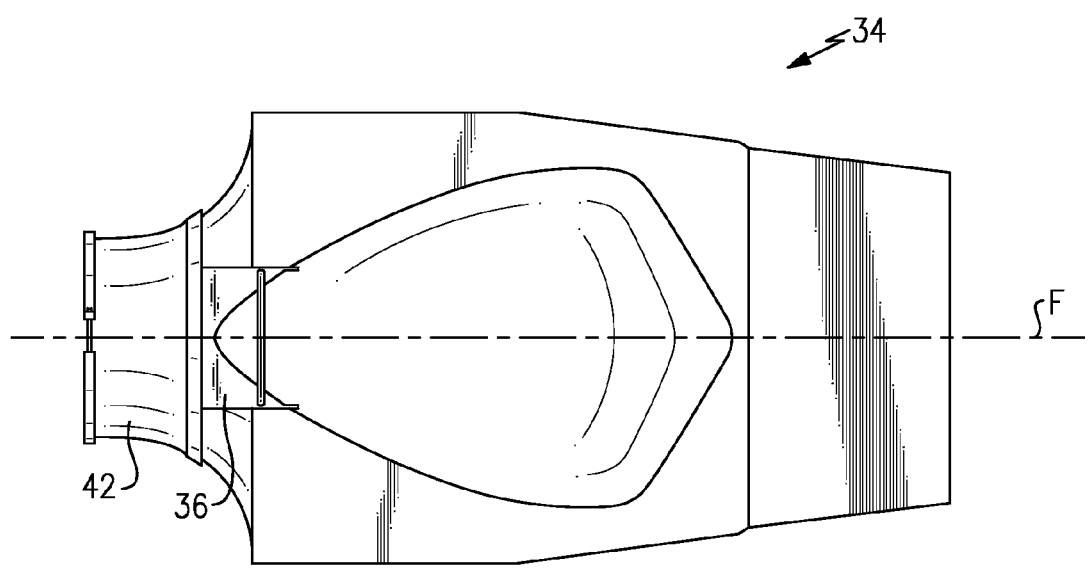
FIG. 6D is a back view of the inlet main body of FIG. 6A.
Figure 6E:
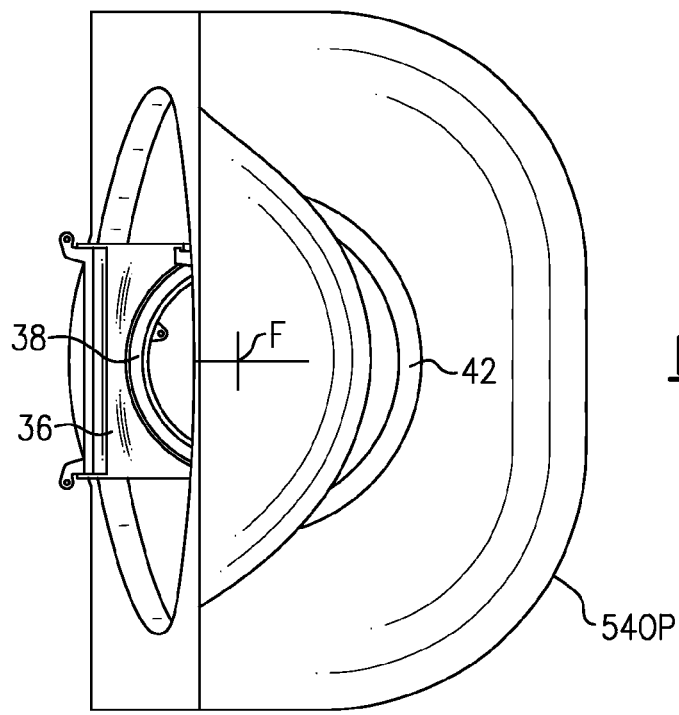
FIG. 6E is a front view of the inlet main body of FIG. 6A.

Referring to FIGS. 6A-6H, the inlet main body 34 generally includes an inner inlet fairing section 52 and a bellmouth inlet faring section 54 generally transverse thereto. The inner inlet fairing section 52 and the bellmouth inlet faring section 54 may be formed as a single component manufactured of, for example, a composite or metal alloy material. The inner inlet fairing section 52 in one non-limiting embodiment is a nose gearbox fairing which at least partially surrounds the nose gearbox N1 which extends from the airframe (FIGS. 7A-7B).

The inner inlet fairing section 52 includes a generally planar portion 52A with a shaft projection portion 52B which bulges therefrom. The shaft projection portion 52B is generally defined along a longitudinal axis F and is generally of a teardrop shape. A forward section 52BF of the shaft projection portion 52B is larger than an aft section 52BA of the shaft projection portion 52B. The aft section 52BA of the shaft projection portion 52B defines an at least partial aperture 53 (FIG. 6G), which, in one non-limiting embodiment, is completed by the closeout 36 to receive the inner duct 38 (FIG. 6H).

Figure 6F:
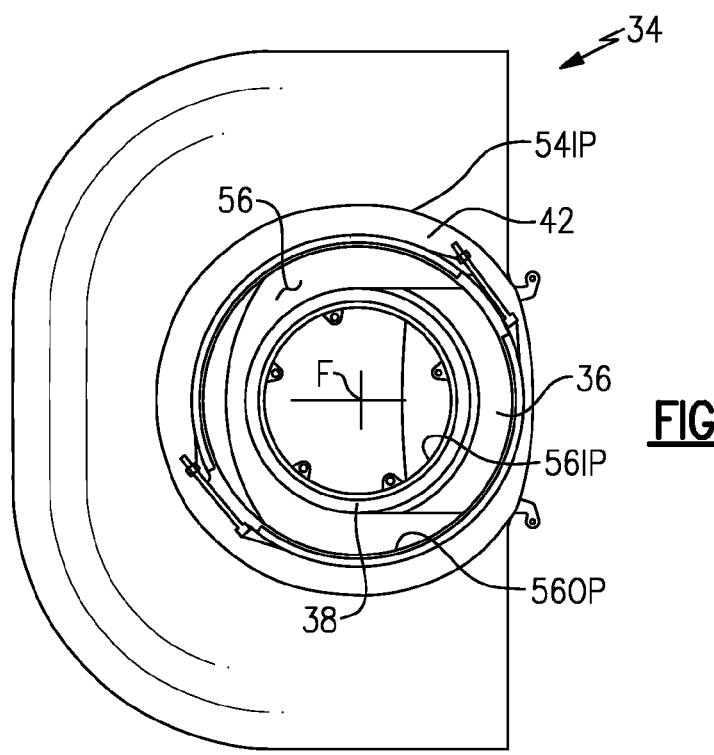
FIG. 6F is a rear view of the inlet main body of FIG. 6A.
Figure 6G:
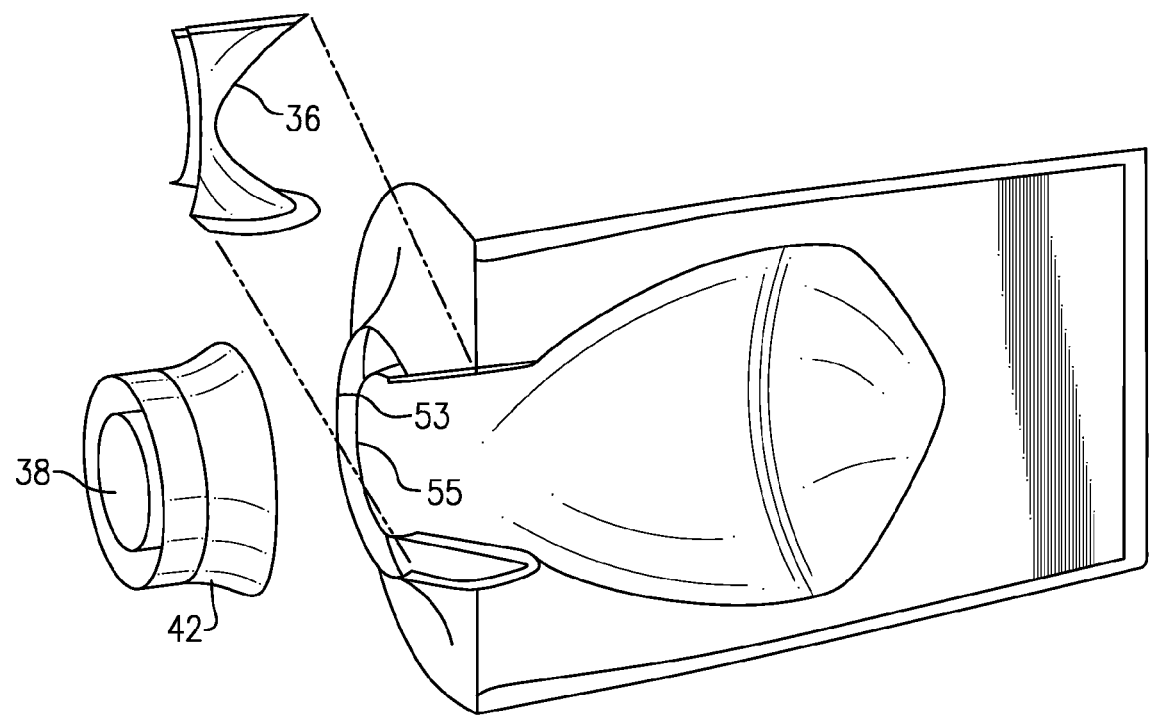
FIG. 6G is a back perspective exploded view of the inlet main body of FIG. 6A with a closeout, inner duct, and outer duct unattached thereto.
Figure 6H:
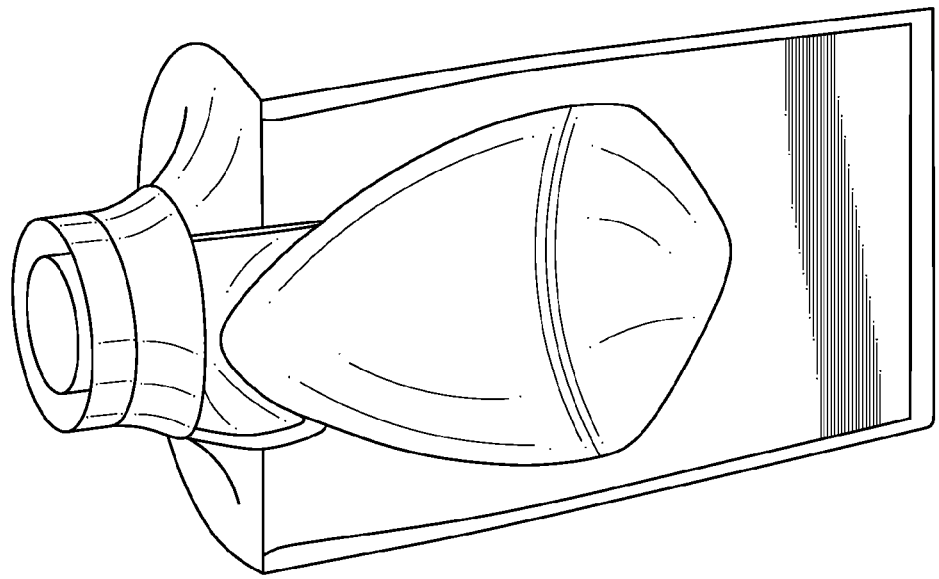
FIG. 6H is a rear perspective exploded view of the inlet main body of FIG. 6G with the closeout, inner duct, and outer duct attached thereto.
Figure 7A:
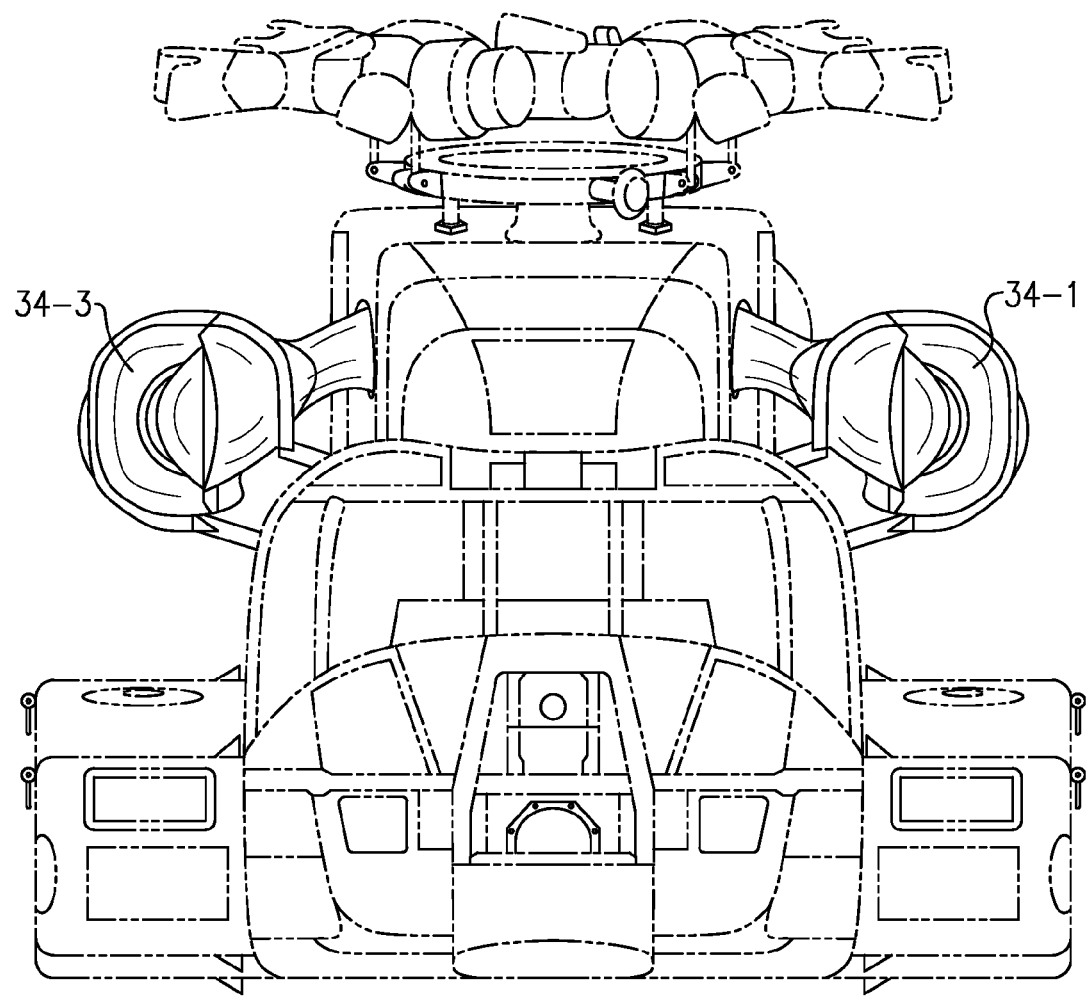
FIG. 7A is a front perspective view of the exemplarily rotary-wing aircraft illustrating the locations of inlet main bodies for engine packages ENG1 and ENG3 in the powerplant system.
Figure 7B:
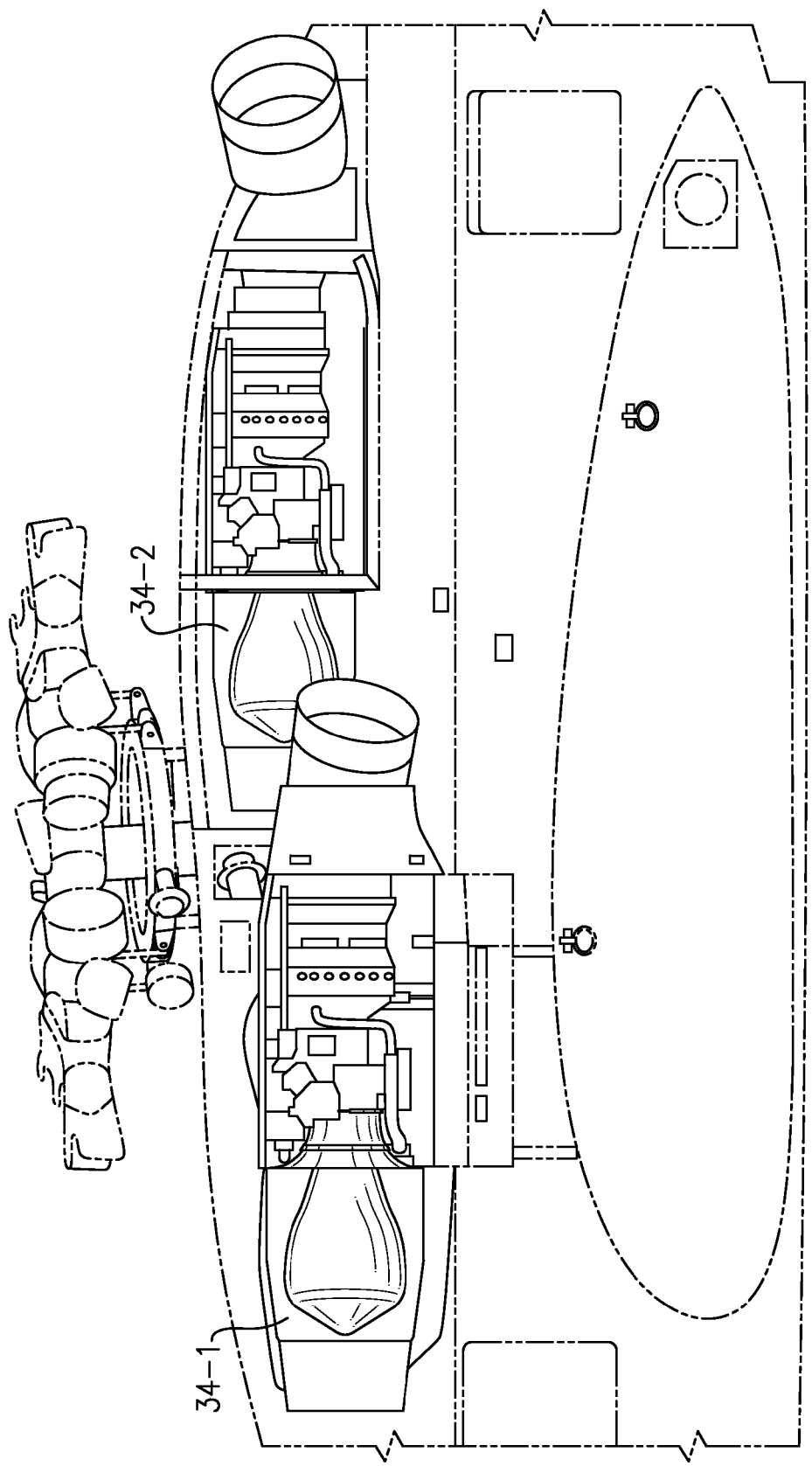
FIG. 7B is a side perspective view of the exemplarily rotary-wing aircraft illustrating the locations of inlet main bodies for engine packages ENG1 and ENG2 in the powerplant system.

The aft section 52BA of the shaft projection portion 52B and inner duct 38 are defined along the axis F to extend toward the bellmouth inlet fairing section 54 to define an inner perimeter 56IP of the annular intake 56 (FIG. 6F).

The bellmouth inlet fairing section 54 defines an outer perimeter 54OP (FIG. 6E) which at least partially corresponds with the outer surface of the EAPS 32. In one non-limiting embodiment, the outer perimeter 54OP of the bellmouth inlet faring section 54 and the outer surface of the EAPS 32 is at least partially arcuate in shape to define a "D" shape.

The bellmouth faring section 54 also defines an inner perimeter 54IP. The inner perimeter 54IP defines an at least partial aperture 55 (FIG. 6G), which, in one non-limiting embodiment, is completed by the closeout 36, to receive the outer duct 42 (FIG. 6H). The inner perimeter 54IP of the bellmouth fairing section 54 and the outer duct 42 are defined along the axis F to define an outer perimeter 56OP of the annular intake 56 (FIG. 6F). The surface between the outer perimeter 54OP and the inner perimeter 54IP of the bellmouth inlet faring section 54 provides a smooth bellmouth airflow surface to accelerate the airflow into the annular intake 56 (FIGS. 6A and 6E).

Figure 8A:
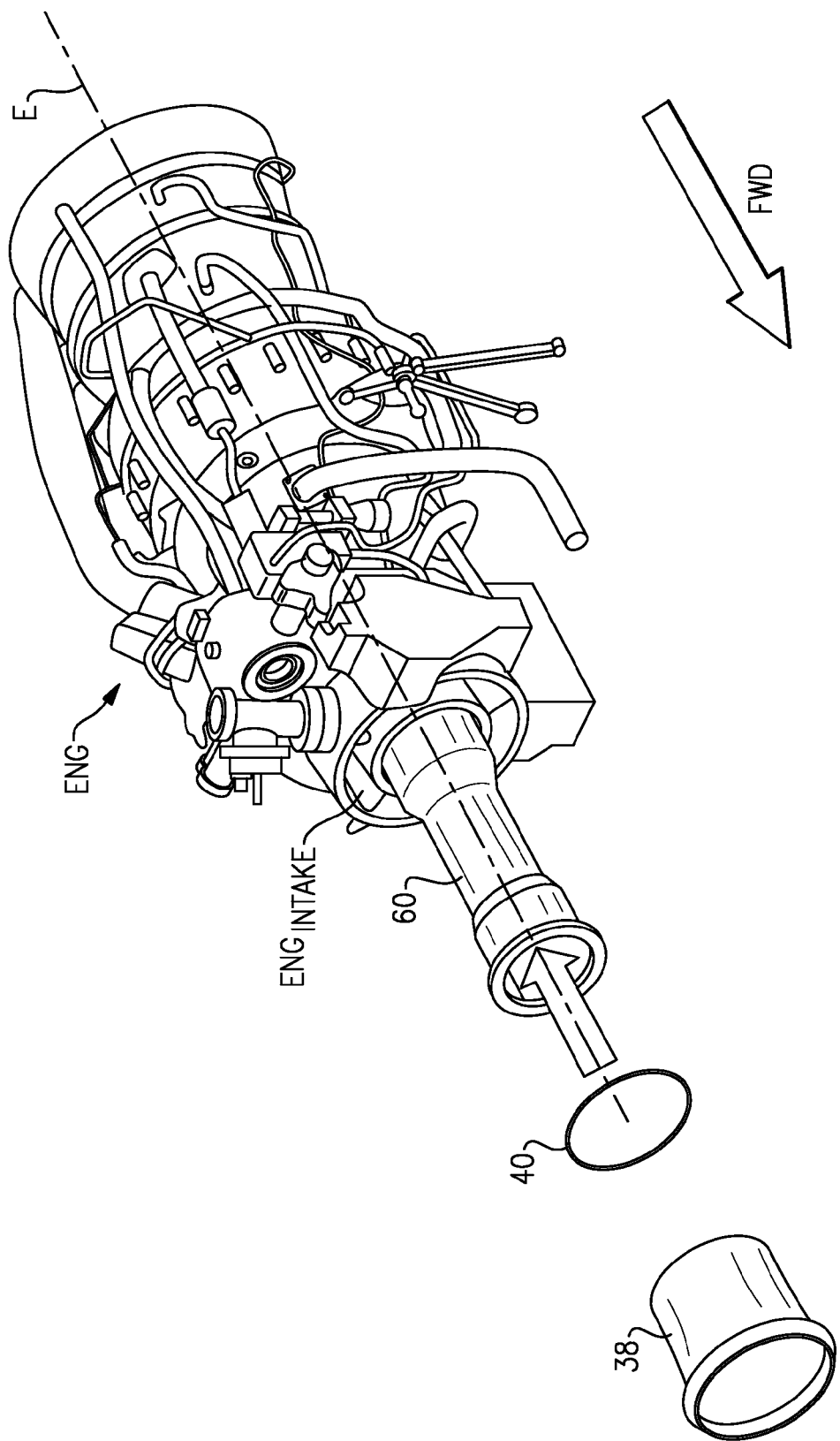
FIG. 8A is a perspective view of an exemplarily engine package illustrating attachment of the inner duct.

Referring to FIG. 8A, the inner duct 38 and inner duct seal 40 are mounted about a torque tube 60 of the engine ENG1 along an engine axis E to define the inner perimeter of the annular intake 56 into the engine intake $ENG_{intake}$. The torque tube 60 is a rotationally fixed structure which contains the engine output shaft system $s1_{out}$ (FIG. 1B).

Figure 8B:
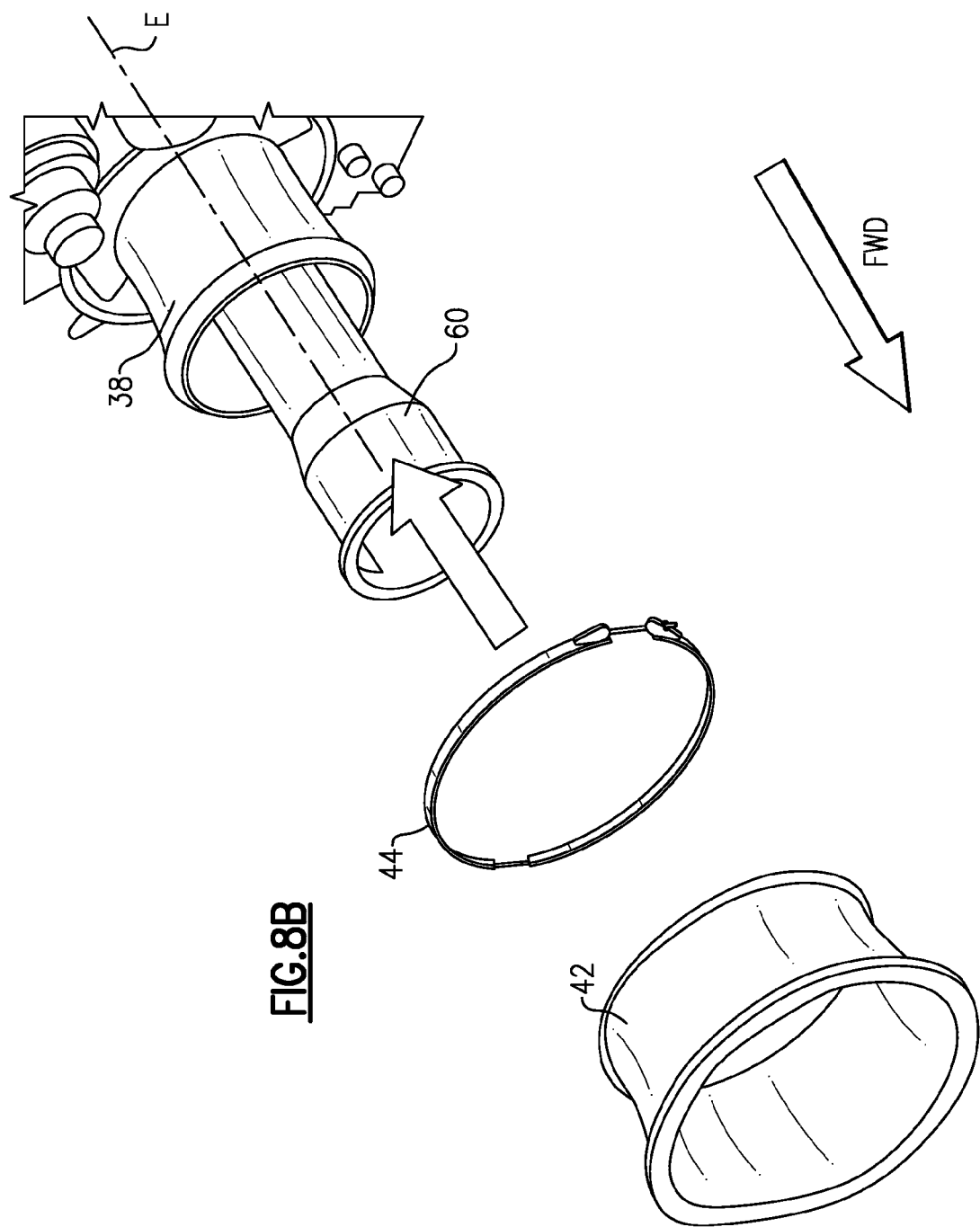
FIG. 8B is a perspective view of the exemplarily engine package illustrating attachment of the outer duct over the inner duct.
Figure 8C:
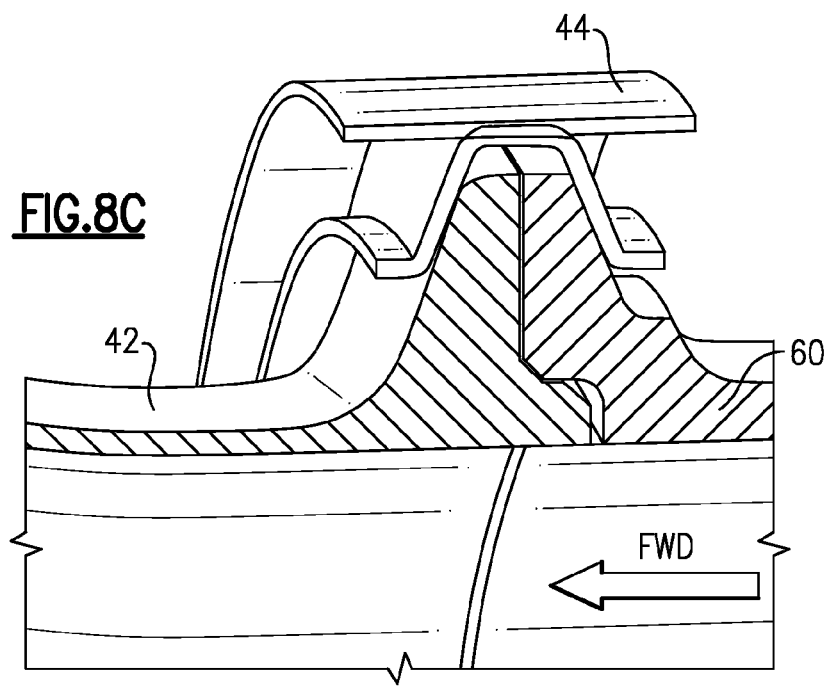
FIG. 8C is an expanded section view of the exemplarily engine package illustrating attachment of the outer duct with a clamp.
Figure 8D:
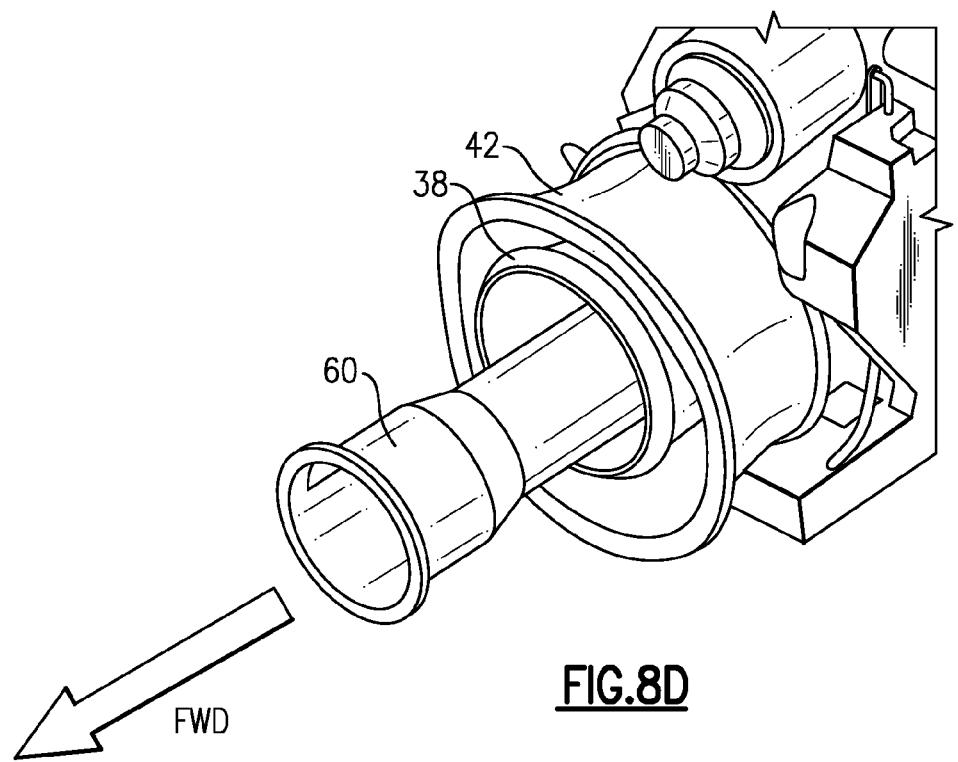
FIG. 8D is a perspective view of the exemplarily engine package illustrating the outer duct and the inner duct attached thereto.

Referring to FIG. 8B, the outer duct 42 is mounted to the engine ENG1 engine intake along the engine axis E with the clamp 44 to define an outer perimeter of the annular intake 56. In one non-limiting embodiment the clamp 44 is a V-band clamp (FIG. 8C) to attach the outer duct 42 (FIG. 8D).

Figure 8E:
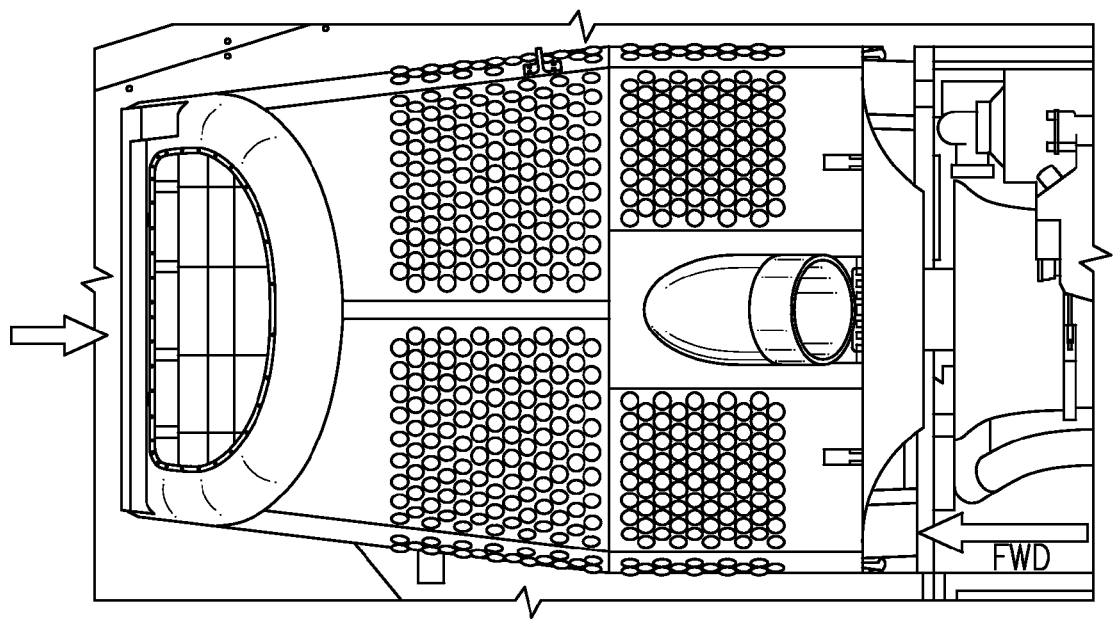
FIG. 8E is a front side perspective view of the exemplarily engine package illustrating the EAPS being attached to the outer duct and the inner duct.
Figure 8F:
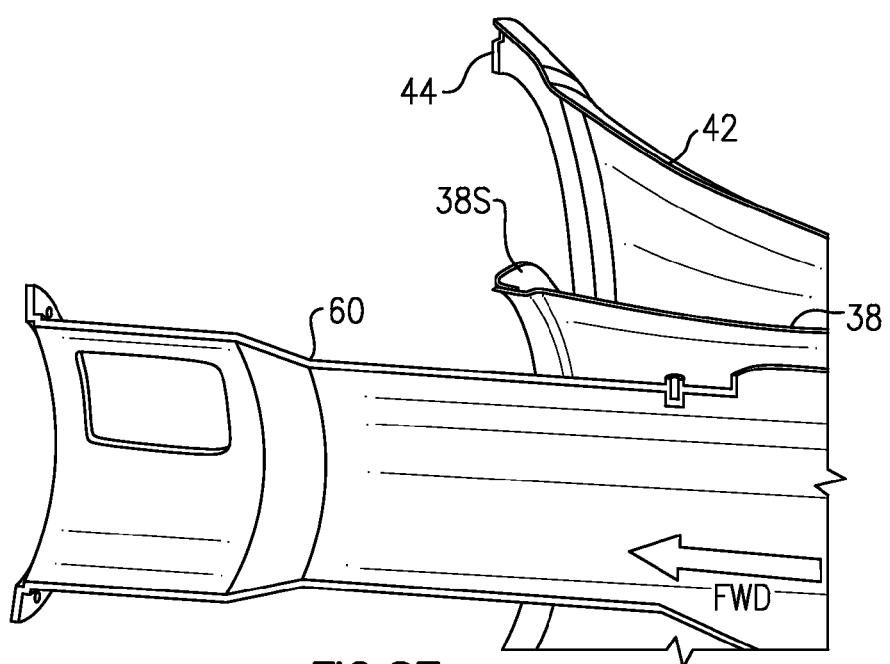
FIG. 8F is a perspective view of the exemplarily engine package illustrating the outer duct and the inner duct seal arrangement.

Referring to FIG. 8E, once the inner duct 38 and the outer duct 42 are mounted to the engine ENG1, the inlet main body 34 and the attached EAPS 32 are mounted to airframe 14. The inlet main body 34 and the EAPS 32 are, in one non-limiting embodiment, slid along axis E for attachment to the ducts 38, 42. The inner inlet fairing section 52 of the inlet main body 34 abuts the inner duct 38 and the bellmouth fairing section 54 abuts the outer duct 42. Flexible seals 38S, 42S (FIG. 8F) facilitate an airtight seal abutment between the inlet main body 34 and the ducts 38, 42.

Figure 8G:
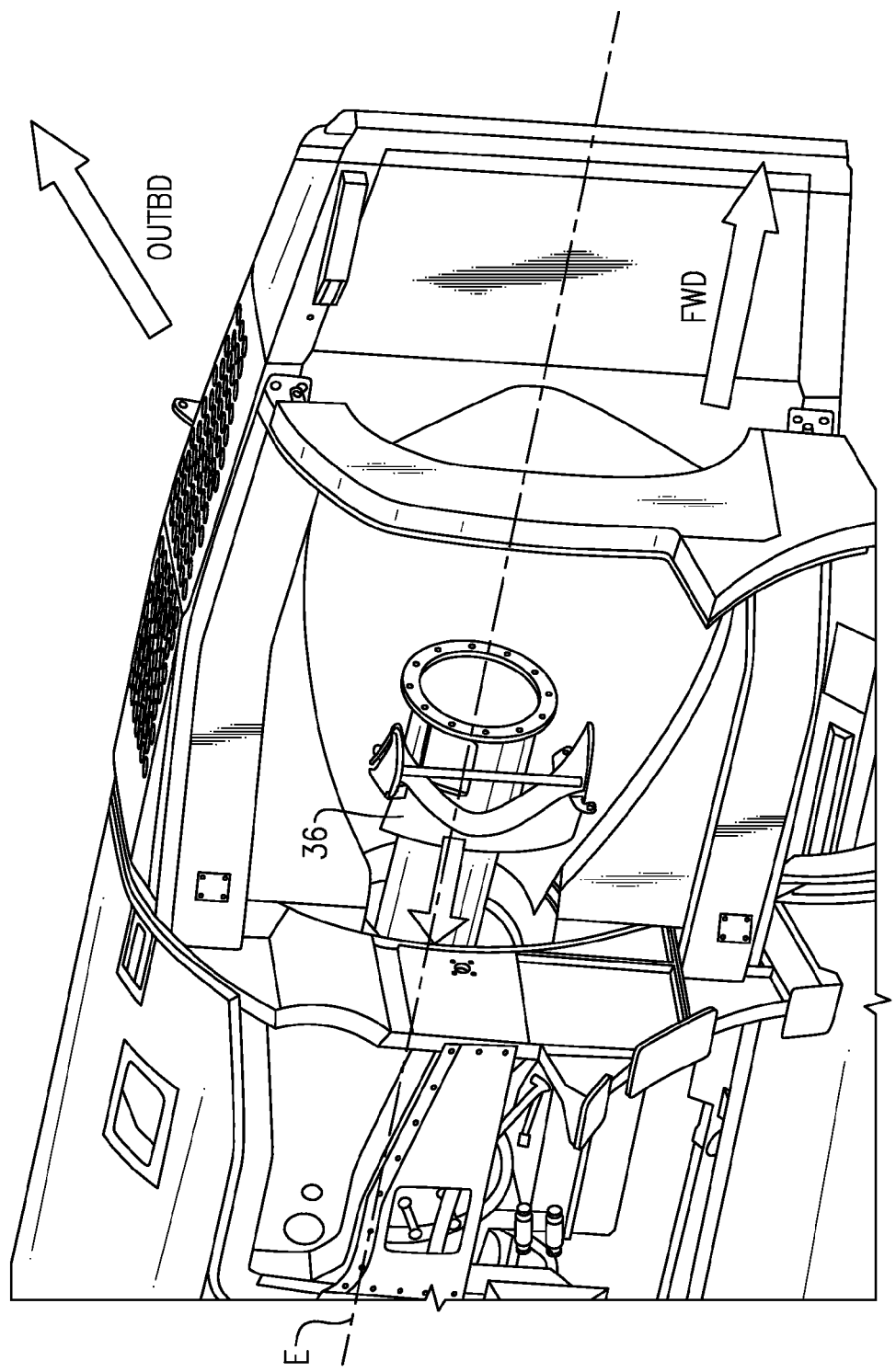
FIG. 8G is a back side perspective view of the exemplarily engine package illustrating the closeout being attached to the inlet main body around the engine package torque tube.

Referring to FIG. 8G, once the inlet main body 34 is mounted around the torque tube 60 and to the ducts 38, 42, the closeout 36 is mounted to the inlet main body 34. The closeout 36 completes the annular intake 56 defined by the inlet main body 34 such that the axis F generally aligns with the engine axis E. It should be understood that the closeout 36 facilitates attachment of the inlet main duct 34 around the torque tube 60 and that other component arrangements which facilitate attachment may alternatively or additionally be provided.

Figure 9A:
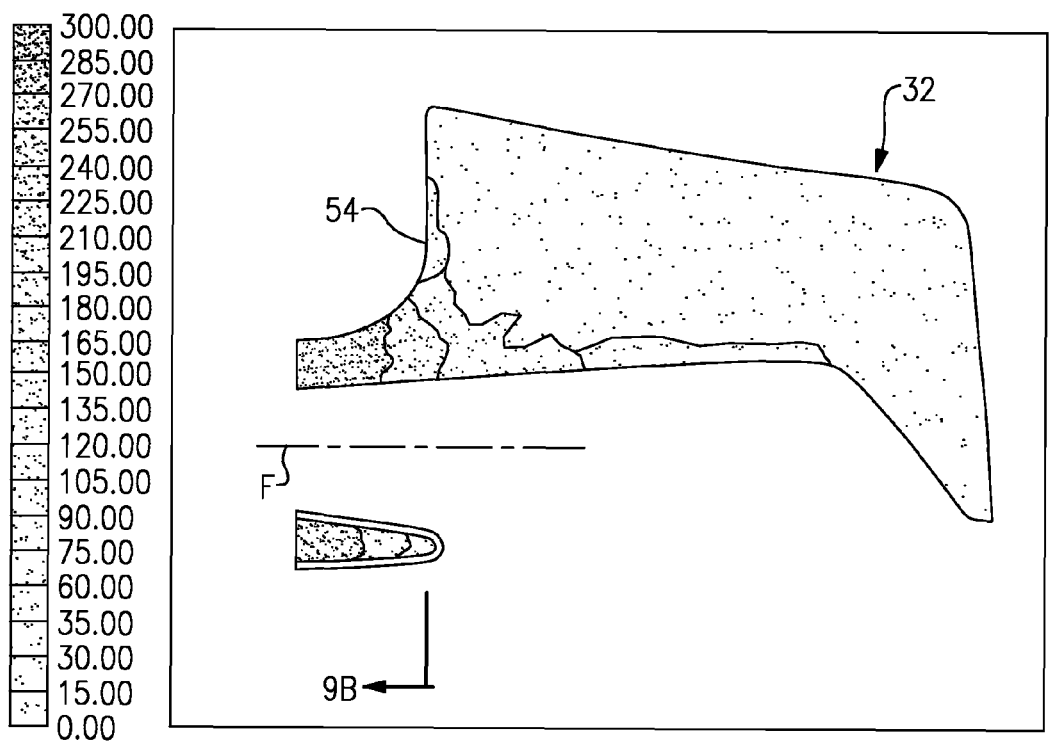
FIG. 9A is a longitudinal sectional view of the Engine Air Particle Separator (EAPS) plenum design illustrating an airflow cross section into illustrating the reduced flow velocities within the plenum with the corresponding reduction in system pressure loss.
Figure 9B:
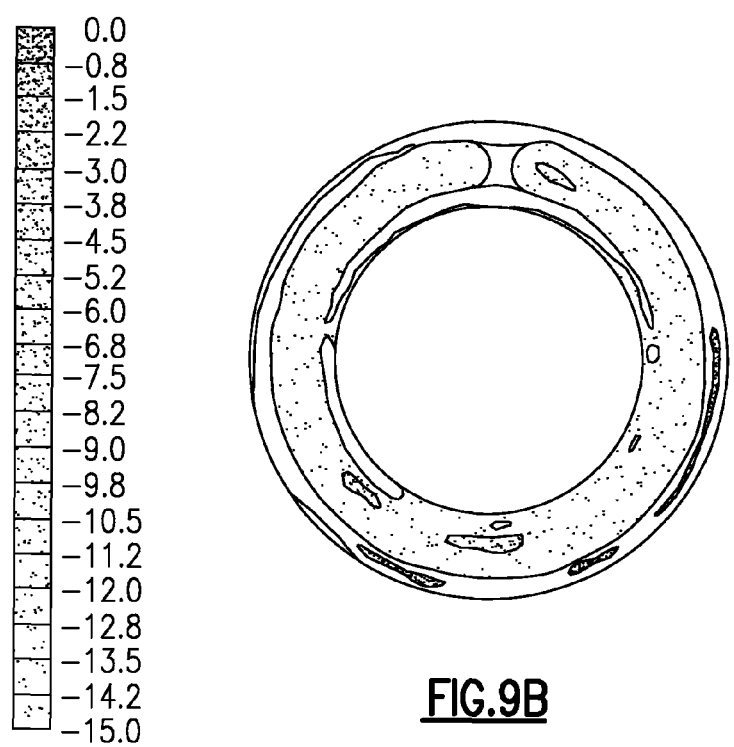
FIG. 9B is a lateral sectional view of the Engine Air Particle Separator (EAPS) of FIG. 9A illustrating the annular airflow into the engine intake.

Referring to FIGS. 9A-9B, the relatively low air velocities within the plenum 32P defined by the EAPS 32 combined with the bellmouth inlet faring section 54 of the inlet main body 34 provide a significant reduction in total pressure loss within the filtration system 30-1. In other words, each engine package ENG receives airflow through the complete annular intake 56 to receive a smooth annular airflow (FIG. 9B) formed by the bellmouth inlet faring section 54 formed at least partially within the EAPS 32. This also provides a compact packaging arrangement for each filtration system 30.

The filtration system 30 disclosed in the non-limiting embodiment, eliminates the conventional S-shaped inlet as airflow is directed around each engine output shaft system $S_{out}$ by the inlet main body 34 which forms an inboard side of the plenum 32P to facilitate airflow into each engine package ENG as the airflow is accelerated toward the aft section of the EAPS 32 and into the annular intake 56 along the relatively smooth bellmouth inlet faring section 54. The plenum 32P forms a relatively large area to receive and collect airflow from the inertial separator swirl tubes 46. The cross-sectional area defined within the plenum 32P and inlet main body 34 significantly reduces the initial airflow velocities and thereby results in a pressure loss reduction of almost 50% versus traditional filter designs. From this relatively slow velocity within the plenum area, the airflow is accelerated in a generally uniform manner through the annular intake 56 for communication to the engine intake $ENG_{intake}$.

The difference in flow velocity nearest to the engine annular intake 56 versus the flow velocity furthest forward from the engine annular intake 56 may be utilized to determine the cross-sectional area within the plenum 32P to provide the desired "plenum like" flow behavior. The inertial separator swirl tubes 46 towards the aft most section of the EAPS 32 will have the highest flow rate because the inertial separator swirl tubes 46 are in a relatively higher suction area nearest to the engine annular intake 56. Toward the front of the EAPS 32, furthest forward from the engine annular intake 56, the inertial separator swirl tubes 46 experience relatively less influence from engine suction such that there is proportionally less flow therethrough. The expanded cross-sectional area of the plenum smoothes out this effect so all the inertial separator swirl tubes 46 from those forward to those nearest the engine annular intake 56 experience generally equivalent levels of airflow. In one non-limiting embodiment, the airflow difference is approximately 20 ft/s through the inertial separator swirl tubes 46 in the area furthest forward from the engine annular intake 56, and 28 ft/s of air flow through the inertial separator swirl tubes 46 nearest the engine annular intake 56; or an approximately 30% flow difference forward to aft. That is, a sufficient cross-sectional area which results in an approximately 30%-35% flow difference forward to aft will thereby achieve the plenum-like flow. This is in contrast to a non-plenum like inlet design (used on legacy designs or "traditional filter designs") in which there may be an approximately 70% difference front to back.

The approximately 30%-35% flow difference in the disclosed, non-limiting embodiment, provides relatively uniform flow velocities upstream of the bellmouth inlet faring section 54 that ensures the losses from flow into the plenum 32P are relatively minimal. The uniform flow provided by the plenum 32P also increases the inertial separator swirl tubes 46 separation efficiency as flow through the inertial separator swirl tubes 46 is more consistent. The uniform flow also facilitates operation of the scavenge flow.

For example, in a conic EAPS where the difference was 15 to 28 ft/s forward to aft (46% difference) may be considered approaching the range of not having optimal plenum behavior, thus, using the 30%-35% guideline, the cross sectional area of the conical EAPS should be slightly increased to achieve the 30%-35% value. It should be understood that different EAPS shapes such as a box-like shape as compared to a conical-like shape may achieve the plenum-like flow result at somewhat different percent difference values but typically will optimally still fall within the approximately 30%-35% flow difference forward to aft. It should also be understood that description of the flow in terms of velocity can be an issue in a inertial separator swirl tube based system because the simulated flow does not necessarily describe a physical velocity through the inertial separator swirl tubes 46. The flow velocities with a CFD model assume large flat panels which provide a certain loss if a certain amount of flow passes therethrough. The inertial separator swirl tubes 46 in reality define relatively smaller, discreet flowpaths across this modeled panel such that the local velocities would be higher.

The specific cross sectional area per unit flow within a particular EAPS 32 may be readily determined to provide optimal flow to the engine annular intake 56 and minimize total pressure losses. The EAPS 32 provides a much more uniform swirl tube 46 flow distribution front to back, a percentage difference of approximately 35%. With a plane normal to the mean flow direction of the EAPS 32 at a point approximately 80% of the total length of the EAPS 32 from the front to the back in the direction of airflow which coincides with the location of the last of the inertial separator swirl tubes 46 (i.e., no more air intake), a cross sectional area of approximately 4.25 ft^2 with a system flow rate of 28 lbm/s provides significantly lower losses relative traditional filter designs. The area through which the air flows is smaller than the interior dimensions of the EAPS 32 due to the incursion made by the shaft projection portion 52B. The highest velocity gradients and mean flow velocities are located adjacent the bellmouth inlet faring section 54, which reduces pressure losses since the bellmouth inlet faring section 54 is a highly optimized flow surface that accelerates the airflow and minimizes the losses through the EAPS 32.

In order to design an EAPS 32 for optimal flow at a flow rate other than approximately 28 lbm/s, a direct ratio may be obtained to predict the required cross sectional area. A cross-sectional area of approximately 0.15 ft^2/lbm/s may be utilized to estimate the EAPS 32 cross sectional area required for engines of higher or lower mass flow rates. It should be understood that the ratio may be adjusted to account for any local velocity spikes due to particular geometry. For example only, an engine with a maximum flow rate of 15 lbm/s may utilize an EAPS cross-sectional area of 15 lbm/s*0.15 ft^2/lbm/s=2.28 ft^2 to obtain plenum-like flow behavior, and the positive aspects therefrom. That is, for every lbm/s of flow, approximately 0.15 ft^2 of cross sectional area is generally required. For 5 lbm/s of engine flow, a cross sectional area of 5 lbm/s*0.15 ft^2/lbm/s=0.76 ft^2 is typically required.

The low pressure loss airflow through the EAPS 32 facilitates uniform swirl tube 46 flow distribution, low velocity gradients within the plenum 32P and low overall total pressure loss. This allows the engine package ENG to produce more power and utilize less fuel so as to provide a rotary-wing aircraft with greater lift capacity. Each filtration system 30 is also relatively smaller than traditional inlet and filter systems of a lesser weight, requires a lesser number of inertial separator swirl tubes, and facilitates an effective structural seal arrangement.

The filtration system 30 may alternatively or additionally be applicable to a barrier filter system as a replacement for and/or as a supplement to the inertial separator swirl tubes 46.

Figure 10A:
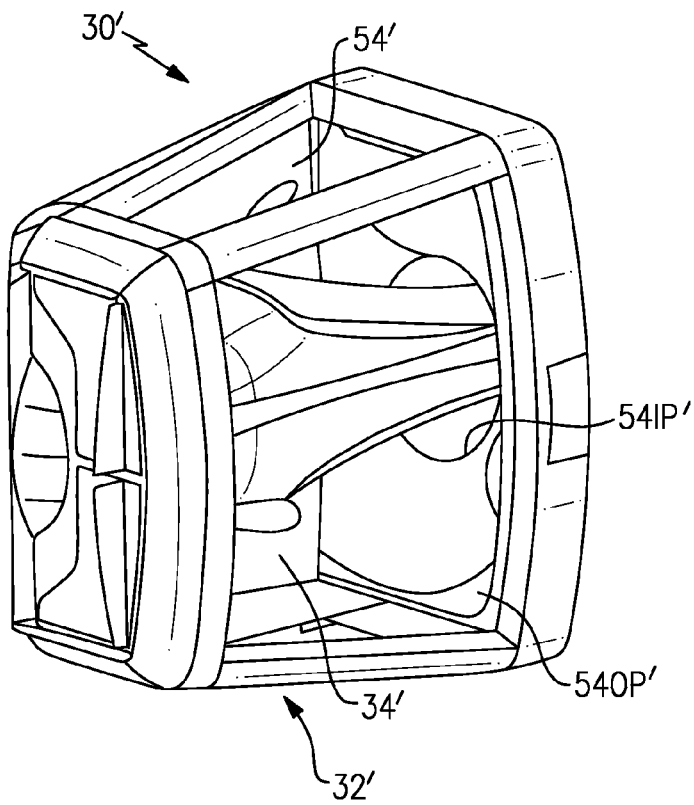
FIG. 10A is a front perspective view of another non-limiting embodiment of a filtration system for one engine package in the powerplant system.
Figure 10B:
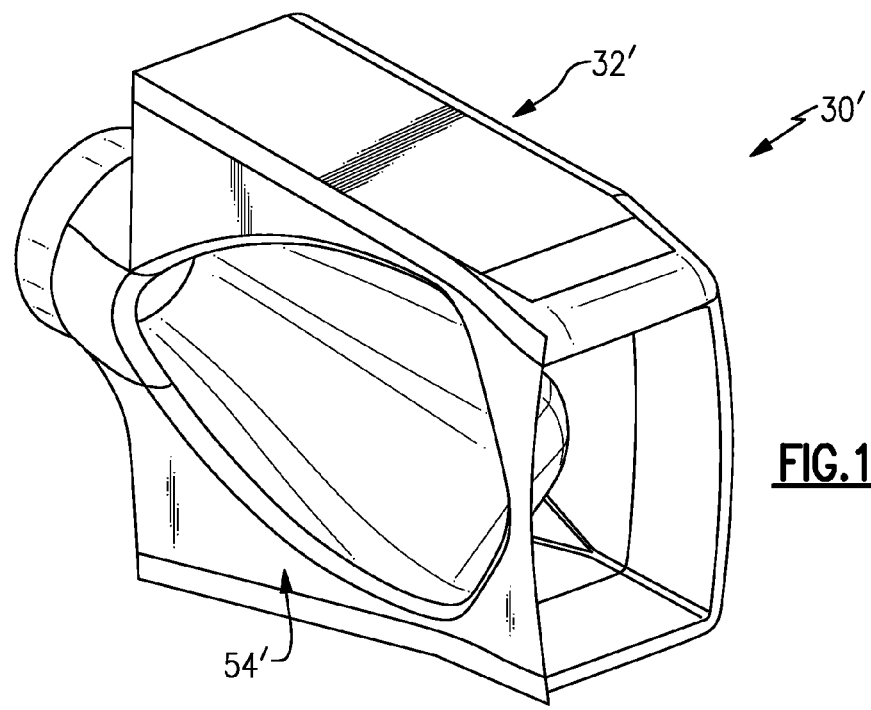
FIG. 10B is a rear perspective view of the filtration system of FIG. 10A.

Referring to FIGS. 10A and 10B, another non-limiting embodiment of the filtration system 30' is illustrated. The filtration system 30' is generally as described above but with an Engine Air Particle Separator (EAPS) 32' which is generally box-shaped. The inlet main body 34', in this non-limiting embodiment, includes an outer perimeter 54OP' of a bellmouth inlet faring section 54' which generally corresponds with the box-shape of the EAPS 32' such that the outer perimeter 54OP' is generally rectilinear. The surface between the outer perimeter 54OP' and an inner perimeter 54IP' of the bellmouth inlet faring section 54' also provides a smooth bellmouth airflow surface to accelerate the airflow into the annular intake 56'.

It should be understood that relative positional terms such as "forward," "aft," "upper," "lower," "above," "below," and the like are with reference to the normal operational attitude of the vehicle and should not be considered otherwise limiting.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations are possible in light of the above teachings. Non-limiting embodiments are disclosed herein, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A filtration system for a gas turbine engine comprising:
an inlet main body comprising an inner inlet fairing section and a bellmouth inlet faring section transverse thereto, said inner inlet fairing section defines a shaft projection portion directed along an axis to extend toward an inner perimeter of said bellmouth inlet faring section; and
an Engine Air Particle Separator (EAPS) adjacent said inlet main body to define a plenum therein.

2. The system as recited in claim 1, further comprising an inner duct which mounts to said shaft projection portion of said inner inlet fairing section along said axis.

3. The system as recited in claim 2, further comprising an outer duct which mounts to said inner perimeter of said bellmouth inlet faring section along said axis, said outer duct at least partially surrounds said inner duct along said axis.

4. The system as recited in claim 1, wherein said shaft projection portion extends from a generally planar portion of said inner inlet fairing section.

5. The system as recited in claim 4, wherein said shaft projection portion is of a generally teardrop shape along said axis.

6. The system as recited in claim 1, wherein said Engine Air Particle Separator (EAPS) at least partially encloses said inlet main body to define said plenum.

7. The system as recited in claim 1, wherein said Engine Air Particle Separator (EAPS) supports a plurality of individual centrifugal separator inertial separator swirl tubes.

8. The system as recited in claim 1, wherein said bellmouth inlet faring section defines a smooth frustroconical airflow surface between said inner perimeter of said bellmouth inlet faring section and an outer perimeter of said bellmouth inlet faring section.

9. The system as recited in claim 8, wherein said outer perimeter of said bellmouth inlet faring section is generally arcuate.

10. The system as recited in claim 8, wherein said outer perimeter of said bellmouth inlet faring section is generally rectilinear.

11. The system as recited in claim 1, further comprising an EAPS door movably mounted to said Engine Air Particle Separator (EAPS), said EAPS door movable between an open position and a closed position.

12. A rotary-wing aircraft comprising:
an airframe;
an inlet main body mounted to said airframe, said inlet main body comprising an inner inlet fairing section and a bellmouth inlet faring section transverse thereto, said inner inlet fairing section defines a shaft projection portion directed along an axis to extend toward an inner perimeter of said bellmouth inlet faring section; and
an Engine Air Particle Separator (EAPS) mounted adjacent to said inlet main body to define a plenum therein.

13. The airframe as recited in claim 12, wherein said inlet main body is mounted to at least partially surround a nose gearbox.

14. The airframe as recited in claim 13, wherein said inlet main body is mounted adjacent to a nose gearbox.

15. The airframe as recited in claim 14, wherein said nose gearbox extends at least partially into said shaft projection portion.

16. The airframe as recited in claim 14, wherein said shaft projection portion extends from a generally planar portion of said inner inlet fairing section, said shaft projection portion is of a generally teardrop shape along said axis with a forward shaft projection portion section larger than an aft shaft projection portion section.

17. The airframe as recited in claim 11, wherein said Engine Air Particle Separator (EAPS) at least partially encloses said inlet main body to define said plenum.

18. A method of particle separation for a gas turbine engine comprising:
communicating a particulate laden airflow into an Engine Air Particle Separator (EAPS) mounted to an inlet main body to produce a substantially filtered airflow, the substantially filtered airflow communicated into a plenum defined by Engine Air Particle Separator (EAPS) to flow through a bellmouth inlet faring section defined by said inlet main body.

19. A method as recited in claim 18, further comprising:
communicating the substantially filtered airflow about an inner inlet fairing section defined by said inlet main body; and
communicating the substantially filtered airflow through an annular inlet defined in part by said inner inlet fairing section and said bellmouth inlet faring section.

20. A method as recited in claim 19, further comprising:
communicating the substantially filtered airflow about a shaft projection portion directed along an axis which passes through the annular inlet.

* * * * *